(12) United States Patent
Almodovar et al.

(10) Patent No.: US 11,628,408 B2
(45) Date of Patent: Apr. 18, 2023

(54) BILAYER ELECTROSPUN MEMBRANES FOR TREATING FRACKING WASTEWATER VIA MEMBRANE DISTILLATION

(71) Applicant: Board of Trustees of the University of Arkansas, Little Rock, AR (US)

(72) Inventors: Jorge Almodovar, Fayetteville, AR (US); Ranil Wickramasinghe, Fayetteville, AR (US); Yu-Hsuan Chiao, Fayetteville, AR (US); David Alfonso Castilla-Casadiego, Fayetteville, AR (US)

(73) Assignee: Board of Trustees of the University of Arkansas, Little Rock, AR (US)

(*) Notice: Subject to any disclaimer, the term of this patent is extended or adjusted under 35 U.S.C. 154(b) by 88 days.

(21) Appl. No.: 17/342,089

(22) Filed: Jun. 8, 2021

(65) Prior Publication Data
US 2021/0379539 A1    Dec. 9, 2021

Related U.S. Application Data

(60) Provisional application No. 63/036,702, filed on Jun. 9, 2020.

(51) Int. Cl.
*B01D 71/78* (2006.01)
*C02F 1/44* (2023.01)
(Continued)

(52) U.S. Cl.
CPC .......... *B01D 71/78* (2013.01); *B01D 61/364* (2013.01); *B01D 67/0093* (2013.01); *B01D 69/02* (2013.01); *B01D 69/12* (2013.01); *B01D 71/027* (2013.01); *B01D 71/34* (2013.01); *B01D 71/40* (2013.01); *B01D 71/70* (2013.01); *C02F 1/447* (2013.01); *B01D 2323/38* (2013.01); *B01D 2323/39* (2013.01); *B01D 2325/18* (2013.01); *B01D 2325/38* (2013.01); *C02F 2103/10* (2013.01); *C02F 2303/20* (2013.01); *C02F 2303/22* (2013.01)

(58) Field of Classification Search
None
See application file for complete search history.

(56) References Cited

U.S. PATENT DOCUMENTS

2010/0145286 A1* 6/2010 Zhang .................. A61L 17/005
525/453

OTHER PUBLICATIONS

G. Dobush, U.S. Forecast to Rival Saudi Arabia as World's Top Oil Exporter by 2024, Fortune, (2019).
(Continued)

*Primary Examiner* — Krishnan S Menon
(74) *Attorney, Agent, or Firm* — Crowe & Dunlevy, P.C.

(57) ABSTRACT

A bilayer electrospun membranes for treating hydraulic fracking wastewater via membrane distillation, and more particularly to bilayer electrospun membranes having an omniphobic layer to prevent low-surface tension solution wicking and an oleophobic antifouling surface to prevent foulant depositing on the membrane. Nanoparticles are decorated on the omniphobic surface through electrochemical interaction, which is coated with a fluorine monomer on the nanoparticles. A zwitterionic co-polymer is grafted using self-assembly between hydroxy groups on the antifouling surface generated by alkaline treatment and anchor segment epoxy groups on zwitterionic co-polymer.

15 Claims, 25 Drawing Sheets

(51) Int. Cl.
    *B01D 69/02*    (2006.01)
    *B01D 69/12*    (2006.01)
    *B01D 71/34*    (2006.01)
    *B01D 71/02*    (2006.01)
    *B01D 71/70*    (2006.01)
    *B01D 71/40*    (2006.01)
    *B01D 67/00*    (2006.01)
    *B01D 61/36*    (2006.01)
    *C02F 103/10*   (2006.01)

(56) References Cited

OTHER PUBLICATIONS

J.M. Estrada, R. Bhamidimarri, A review of the issues and treatment options for wastewater from shale gas extraction by hydraulic fracturing, Fuel, 182 (2016) 292-303.

Y.-H. Chiao, S.-T. Chen, T. Patra, C.-H. Hsu, A. Sengupta, W.-S. Hung, S.-H. Huang, X. Qian, R. Wickramasinghe, Y. Chang, Zwitterionic forward osmosis membrane modified by fast second interfacial polymerization with enhanced anlifouling and antimicrobial properties for produced water pretreatment, Desalination, 469 (2019) 114090.

M. Kamaz, A. Sengupta, A. Gutierrez Y.-H. Chiao, R. Wickramasinghe, Surface Modification of PVDF Membranes for Treating Produced Waters by Direct Contact Membrane Distillation, International journal of environmental research and public health, 16 (2019) 685.

C. Boo, J. Lee, M. Elimelech, Omniphobic Polyvinylidene Fluoride (PVDF) Membrane for Desalination of Shale Gas Produced Water by Membrane Distillation, Environmental Science & Technology, 50 (2016) 12275-12282.

D.J. Miller, X. Huang, H. Li, S. Kasemset, A. Lee, D. Agnihotri, T. Hayes, D.R. Paul, B.D. Freeman, Fouling-resistant membranes for the treatment of flowback water from hydraulic shale fracturing: A pilot study, Journal of membrane science, 437 (2013) 265-275.

Y.-X. Huang, Z. Wang, J. Jin, S. Lin, Novel Janus membrane for membrane distillation with simultaneous fouling and wetting resistance, Environmental science & technology, 51 (2017) 13304-13310.

J. Li, S. Guo, Z. Xu, J. Li, Z. Pan, Z. Du, F. Cheng, Preparation of omniphobic PVDF membranes with silica nanoparticles for treating coking wastewater using direct contact membrane distillation: Electrostatic adsorption vs. chemical bonding, Journal of membrane science, 574 (2019) 349-357.

Y. Liao, R. Wang, A.G. Fane, Engineering superhydrophobic surface on poly (vinylidene fluoride) nanofiber membranes for direct contact membrane distillation, Journal of membrane science, 440 (2013) 77-87.

E.-J. Lee, A.K. An, T. He, Y.C. Woo, H.K. Shon, Electrospun nanofiber membranes incorporating fluorosilane-coated TiO2 nanocomposite for direct contact membrane distillation, Journal of Membrane Science, 520 (2016) 145-154.

M. Baghbanzadeh, D. Rana, T. Matsuura, C.Q. Lan, Effects of hydrophilic CuO nanoparticles on properties and performance of PVDF VMD membranes, Desalination, 369 (2015) 75-84.

Y.-H. Chiao, A. Sengupta, S.-T. Chen, S.-H. Huang, C.-C. Hu, W.-S. Hung, Y. Chang, X. Qian, S. Ranil Wickramasinghe, K.-R. Lee, J.-Y. Lai, Zwitterion augmented polyamide membrane for improved forward osmosis performance with significant antifouling characteristics, Separation and Purification Technology, (2018).

Q.-F. An, W.-D. Sun, Q. Zhao, Y.-L. Ji, C.-J. Gao, Study on a novel nanofiltration membrane prepared by interfacial polymerization with zwitterionic amine monomers, Journal of membrane science, 431 (2013) 171-179.

A. Venault, Y. Chang, Designs of Zwitterionic Interfaces and Membranes, Langmuir, (2018).

A.K. Kota, G. Kwon, A. Tuteja, The design and applications of superomniphobic surfaces, NPG Asia Materials, 6 (2014) e109.

Y.-H. Chiao, A. Sengupta, S.-T. Chen, S.-H. Huang, C.-C. Hu, W.-S. Hung, Y. Chang, X. Qian, S.R. Wickramasinghe, K.-R. Lee, J.-Y. Lai, Zwitterion augmented polyamide membrane for improved forward osmosis performance with significant antifouling characteristics, Separation and Purification Technology, (2018).

X. Zhang, J. Tian, S. Gao, Z. Zhang, F. Cui, C.Y. Tang, In situ surface modification of thin film composite forward osmosis membranes with sulfonated poly (arylene ether sulfone) for anti-fouling in emulsified oil/water separation, Journal of membrane science, 527 (2017) 26-34.

A. Venault, T.-C. Wei, H.-L. Shih, C.-C. Yeh, A. Chinnathambi, S.A. Alharbi, S. Carretier, P. Aimar, J.-Y. Lai, Y. Chang, Antifouling pseudo-zwitterionic poly (vinylidene fluoride) membranes with efficient mixed-charge surface grafting via glow dielectric barrier discharge plasma-induced copolymerization, Journal of Membrane Science, 516 (2016) 13-25.

\* cited by examiner

BILAYER ELECTROSPUN MEMBRANES FOR TREATING FRACKING WASTEWATER VIA MEMBRANE DISTILLATION

CROSS REFERENCE TO RELATED APPLICATIONS

This application claims the benefit of U.S. Provisional Patent Application No. 63/036,702 filed on Jun. 9, 2020, and incorporates said provisional application by reference in its entirety into this document as if fully set out at this point.

BACKGROUND OF THE INVENTION

1. Field of the Invention

This invention relates generally to bilayer electrospun membranes for treating fracking wastewater via membrane distillation, and more particularly to bilayer electrospun membranes having an omniphobic layer to prevent low-surface tension solution wicking and an oleophobic antifouling surface to prevent foulant depositing on the membrane.

2. Description of the Related Art

The United States is currently the top crude oil exporter in the world with a crude oil productivity of 3.6 million barrels per day. The growth in crude oil production is due in large part to the rapid development of hydraulic fracturing technology; however, hydraulic fracturing requires the use of large amounts of water, around 2000-4600 $m^3$ per well. This hydraulic fracturing flow back and produced water (PW) is highly impaired. Typically, it is deep well injected, used to stimulate new wells, or discharged. All three disposal options, however, require various degrees of water treatment. Treating the recovered water for beneficial uses is the most environmentally sustainable solution. Membrane-based treatment technologies are appealing as membrane modules are easily scalable, lightweight, and have a small footprint. Thus, the membrane modules can be moved to different wellheads as required. However, the water is highly impaired, often containing high total dissolved solids (TDS) at more than 100,000 ppmw. Further, the presence of dissolved polar and non-polar organic compounds as well as surfactants means that membrane fouling is a major concern.

Produced water treatment is a significant cost to companies and it is unfriendly to the environment. In the United States, PW must be disposed into the regulation disposal wells; therefore, the transportation is costly which can be up to $4 per barrel. Additionally, the vast amount of PW may cause contamination to the groundwater. Thus, the development of produced water treatment will benefit both the environment and economy. Based on the wastewater treatment recovery, the cost of transportation could be decreased.

Pressure-driven and osmotically driven membrane processes, such as reverse osmosis (RO), nanofiltration (NF), ultrafiltration (UF), microfiltration (MF) and forward osmosis (FO), have been used to purify different types of wastewaters. However, these treatment technologies are generally not practical for highly impaired PW as significant pretreatment of the feedstock would be required.

Membrane distillation (MD) is another method to treat fracking wastewater with high salinity. The driving force for MD is the vapor pressure difference between the feedstock and permeate sides. Unlike RO, the driving force is less sensitive to high TDS. MD can treat fracking PW because of the low hydraulic pressure requirement and higher salt rejection above 99%, resulting in less components passing through the membrane.

Out of the different modes of operations for MD, direct contact membrane distillation (DCMD) treats fracking PW by placing the feed and permeate streams in direct contact with the membrane. Hydrophobic membranes are used as the aim is to allow water vapor to pass through the membrane pores and condense on the permeate side. Dissolved, non-volatile species will be concentrated in the retentate, and volatile species will pass into the permeate. However, organic compounds and surfactants will adsorb onto the surface of typical commercially available hydrophobic membranes, such as polytetrafluoroethylene (PTFE), polyvinylidene difluoride (PVDF), and polydimethylsiloxane (PDMS).

Recent efforts have focused on developing omniphobic surfaces. Omniphobic membranes can be created by decorating nanoparticles, such as silica, silver, $TiO_2$, CuO, $CaCO_3$, containing a fluorine coating onto the membrane. However, omniphobic membranes still are susceptible to surface fouling by low surface energy compounds, such as surfactants. To extend the life of the membrane, an antifouling surface is necessary, and as such, these omniphobic surfaces should contain a re-entrant structure that provides a kinetic barrier to adsorption of low surface energy compounds.

Electrospun membranes containing nanofibers with a re-entrant structure could provide an ideal base membrane, which could be surface modified to impart omniphobic surface properties. For example, nanoparticles have been attached to the surface of electrospun PVDF membranes to create a hydrophobic lotus-like structure through electrostatic or chemical bond interactions. An omniphobic surface was created by further coating the surface with a fluorine-containing material.

Several studies have been reported the use of hydrogels, ionic liquids, chitosan, and polyethylene glycol (PEG) to tune the surface hydrophilicity and hydrophobicity of the MD membrane. Among the different methods, tuning the surface using zwitterions is the most attractive method, which could also enhance the antifouling properties of the membrane due to the presence of oppositely charged moieties on the same segment. Moreover, zwitterion augmented membranes could prevent both positive and negative charged foulants from adsorbing onto the membrane surface.

Several methods have been used to modify membranes for MD applications such as physical coating and free-radical polymerization. These methods suffer from disadvantages such as instability of the coating for long-term operation and loss of the antiwetting property due to polymerization inside the pores. Ideally, only the outer membrane surface should be modified. Compared to other methods, the "grafting to" method where a performed polymer is grafted to the membrane surface appears to be a promising method that could be commercialized. Due to diffusion limitations and steric hindrance effects, grafting is suppressed on the inside pore surface.

The invention disclosed herein contributes to advancing the field of DCMD for wastewater treatment applications, including fracking wastewater, by providing an electrospun zwitterionic bilayer membrane that significantly reduces fouling and increases the life of the membrane and efficiency of the wastewater treatment process.

It is desirable to provide bilayer electrospun MD membranes having a feedstock-facing surface and a permeate-facing surface. The feedstock-facing surface of the membrane has an oleophobic surface to prevent foulant adsorption, and the permeate-facing surface has an omniphobic surface that suppresses scale formation and low-surface tension compounds from wicking and fouling the membrane.

It is further desirable to provide bilayer DCMD membranes that are prepared using electrospinning and subsequently modified to enhance the membranes antifouling and antiwetting properties. The bilayer DCMD membranes have an omniphobic surface to prevent low-surface tension solution wicking and an oleophobic surface that prevents foulant depositing on the surface. The membranes are decorated using nanoparticles to create a hydrophobic lotus nanostructure through electrostatic interaction followed by coating using a fluorine monomer on the nanoparticle to create the omniphobic layer of the membrane. Lastly, an antifouling branch is grown by grafting a zwitterionic polymer on the oleophobic surface.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates to a bilayer electrospun membrane having an omniphobic, permeate-facing surface configured to suppress scale formation and low-surface tension compounds from wicking and fouling the membrane and an oleophobic, feedstock-facing surface configured to prevent foulants from depositing on and adsorbing to the membrane. The oleophobic surface has a zwitterionic antifouling co-polymer (e.g., poly(glycidyl methacrylate-sulfobetaine methacrylate)) grafted thereto. The omniphobic surface has polyvinylidene difluoride-cetyltrimethylammonium bromide with nanoparticle fibers decorated or grown thereon through electrochemical interactions, and the nanoparticle fibers are then coated with a fluorine monomer (e.g., 1H,1H,2H,2H-perfluorodecyltriethoxysilane).

In general, in a second aspect, the invention relates to an electrospun zwitterionic membrane having an omniphobic surface comprising (a) a positively charged cetyltrimethylammonium bromide monomer, (b) negatively charged silica nanoparticle fibers decorated or grown on the cetyltrimethylammonium bromide monomer, and (c) a fluorine monomer coated on the silica nanoparticle fibers; and an oleophobic surface comprising a zwitterionic antifouling co-polymer grafted thereto through epoxy ring-opening reactions.

In general, in a third aspect, the invention relates to a bilayer membrane distillation membrane for separation of hydraulic fracturing-produced water via membrane distillation. The membrane has polyvinylidene difluoride-cetyltrimethylammonium bromide fibers configured to face a permeate stream and alkali-treated polyvinylidene difluoride nanofibers configured to face a feed stream. The polyvinylidene difluoride-cetyltrimethylammonium bromide fibers are modified to form an omniphobic surface of the membrane, and the omniphobic surface has salinized silica nanoparticles thereon. The polyvinylidene difluoride nanofibers are modified to form a hydrophilic surface of the membrane, and the hydrophilic surface has a zwitterionic poly(glycidyl methacrylate-sulfobetaine methacrylate) polymer grafted to the alkali-treated polyvinylidene difluoride nanofibers.

In general, in a fourth aspect, the invention relates to a process for preparing a polyvinylidene difluoride (PVDF) membrane. The process includes the steps of: (a) electrospinning a PVDF polymer solution to form a PVDF fiber membrane; (b) fabricating an omniphobic surface of the PVDF fiber membrane, and (c) fabricating an oleophobic surface of the PVDF fiber membrane. The omniphobic surface is fabricated by contacting the PVDF fiber membrane with a positively charged cetyltrimethylammonium bromide (CTAB) monomer to generate positively charged PVDF-CTAB fibers, growing negative charged silica nanoparticles on the positively charged PVDF-CTAB fibers through electrostatic absorption interaction, and coating a fluorine monomer on the silica nanoparticles to fabricate the omniphobic surface of the PVDF fiber membrane. The oleophobic surface is fabricated by contacting the PVDF fiber membrane with an alkaline solution to generate hydroxy groups and grafting a zwitterionic polymer on the hydroxy groups through epoxy ring-opening reactions to fabricate the oleophobic surface of the PVDF fiber membrane. The positively charged monomer can be (cetyltrimethylammonium bromide (CTAB), while the alkaline solution can be sodium hydroxide (NaOH).

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
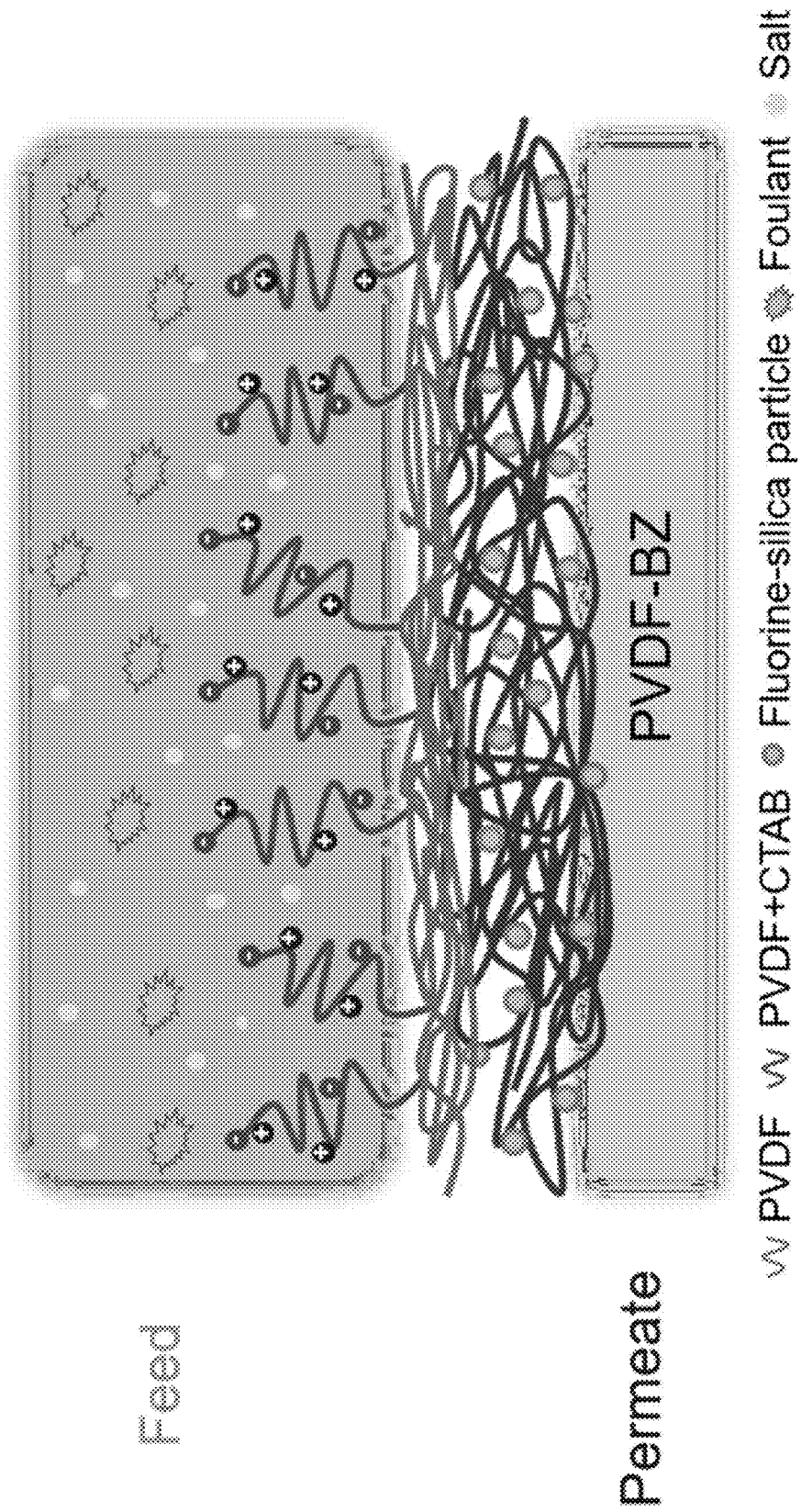
FIG. 1 is a schematic representation of an electrospun zwitterionic bilayer membrane for the separation of hydraulic fracturing-produced water via membrane distillation in accordance with an illustrative embodiment of the invention disclosed herein.

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

The invention generally relates to bilayer electrospun membranes for treating fracking wastewater via membrane distillation. As illustrated in FIG. 1, the bilayer electrospun membranes have an omniphobic, permeate-facing surface that suppresses scale formation and low-surface tension compounds from wicking and fouling the membrane, and an oleophobic, feedstock-facing surface that prevents foulants from depositing on and adsorbing to the membrane. The bilayer membranes are prepared using electrospinning, and the membrane is subsequently modified to enhance its antifouling property as well as maintaining the omniphobicity of the membrane. Electrospun membranes possess a re-entrant texture and an interconnected pore structure, which enhance the roughness and vapor flux in the membrane, respectively.

Nanoparticle fibers (e.g., silica) are decorated or grown on the omniphobic surface through electrochemical interaction to form a nanoparticle fiber layer. The nanoparticle fiber layer is then coated with a fluorine monomer (e.g., 1H,1H, 2H,2H-perfluorodecyltriethoxysilane (FAS)), to form a fluorine-nanoparticle fiber support layer for maintaining the membrane's antiwetting properties.

A zwitterionic co-polymer poly (glycidyl methacrylate-sulfobetaine methacrylate (GS)) is grafted on the oleophobic, feedstock-facing surface using self-assembly between hydroxy groups on the surface generated by alkaline treatment and anchor segment epoxy groups on GS. Zwitterionic tuning provides a desirable method to enhance the antifouling properties of the bilayer electrospun membranes by their charged moieties on the same segment at the same time. Moreover, zwitterion-augmented, the bilayer electrospun membranes further remove both the positive and negative charged foulants approaching the membrane, which improves both the antiwetting property of low-surface tension components and the antifouling property of the membranes. The bilayer electrospun membranes also have an increased lifespan due to fouling reduction.

The bilayer MD membranes having antifouling and antiwetting properties are prepared by electrospinning, where a high voltage is applied to the polymer solution, then the polymer fiber membrane is collected on the collector. The oleophobic and omniphobic surfaces of the membrane are prepared in different casting solution recipes, in which a positively charged monomer (cetyltrimethylammonium bromide (CTAB)) is added to fabricate a positive charged electrospun membrane. Negative charged silica nanoparticles are grown on the fibers through electrostatic absorption interaction to create a high roughness surface. For the reintroduction of the low surface tension solution resistant onto the membranes, a fluorine monomer is coated on the nanoparticle layer. In addition, the oleophobic surface of the membrane is placed in contact with an alkaline solution (e.g., sodium hydroxide (NaOH)) to generate hydroxy groups, then the zwitterionic antifouling polymer is grafted on the hydroxy surface through epoxy ring-opening reaction. The surface energy of the membrane is then tuned by the fluorine monomer, which can be observed by a static contact angle analysis.

The bilayer MD membrane disclosed herein include PVDF-CTAB and PVDF nanofibers. The surface properties of PVDF-CTAB nanofibers that face the permeate stream are modified to create an omniphobic surface. The surface properties of the PVDF nanofibers that face the feed stream are modified to create a hydrophilic surface. The omniphobic surface contain silica nanoparticles that are salinized to lower their surface energy. The hydrophilic surface contains a zwitterionic polymer that is grafted to the alkali treated PVDF nanofiber through the "grafting to" modification. The resulting omniphobic membrane surface displays an underwater oil contact angle of >150°. The membrane surface properties of the surfaces that face the feed and permeate streams are tuned to maximize flux, salt rejection and productivity. Electrospun membranes are attractive for MD as they contain a re-entrant structure that provides a kinetic barrier to the adsorption of low surface energy compounds such as surfactants.

EXAMPLES

The bilayer electrospun membranes disclosed herein is further illustrated by the following examples, which are provided for the purpose of demonstration rather than limitation. The performance of the bilayer electrospun membranes was investigated against hydraulic fracturing produced water obtained from a commercial facility, and the membranes performance was compared to a commercial superhydrophobic PVDF membrane.

All reagents used in these examples were of ACS reagent grade without any purification unless otherwise specified. Pelleted poly(vinylidene fluoride-co-hexafluoropropylene) (PVDF-HFP), sodium chloride (NaCl), and silica nanoparticles (Ludox HS-40) were purchased from Sigma-Aldrich (St. Louis, Mo., USA). Dimethylformamide (DMF), acetone, ethanol, hexane, CTAB, sodium hydroxide (NaOH), glycidyl methacrylate (GMA), azobisisobutyronitrile (AIBN), and sulfobetaine methacrylate (SBMA) were purchased from VWR (Atlanta, Ga., USA). The 1H,1H,2H,2H-perfluorodecyltriethoxysilane monomer (FAS, Matrix Scientific, Columbia, S.C., USA) was used to decorate the silica nanoparticle on the PVDF electrospun membrane. Mineral oil was purchased from Equate (Rogers, Ark., USA) and was used to characterize surface hydrophobicity.

Synthesis of the Zwitterion Copolymers

Poly(glycidyl methacrylate-sulfobetaine methacrylate) (pGS, M.W. 62.52 kD) was used to modify the electrospun PVDF membrane through a "grafting to" approach. pGS was synthesized through free radical polymerization of SBMA and GMA. Briefly, GMA and SBMA were dissolved separately in a 25 wt % aqueous methanol solution. These solutions were placed into a round-bottom flask and mixed for 10 min. The mole ratio of GMA to SBMA was kept at 2:8. Afterwards, 0.15 g AIBN was gently added to the flask, and the solution was stirred for 15 min. After obtaining a homogeneous solution, the reaction was continued for 6 h at 60° C. in a nitrogen environment. The reaction solution was cooled in an ice bath. The white precipitate was purified twice using 1 L of methanol. The pGS copolymer was obtained through lyophilization.

Electrospun Membrane Fabrication

The membranes were fabricated using a laboratory scale electrospinning apparatus consisting of a syringe pump (NE-1000, New Era pump system Inc., Farmingdale, N.Y., USA), power supply (Gamma High Voltage Research Inc., Ormond, Fla., USA), collector drum (Falco Co., Ltd., New Taipei City, Taiwan), and horizon reciprocating stage (Membrane Science Inc., Hsinchu, Taiwan) in a non-conducting plastic box. The temperature and humidity of the environment were controlled at 23° C. and 55%, respectively.

Figure 2:
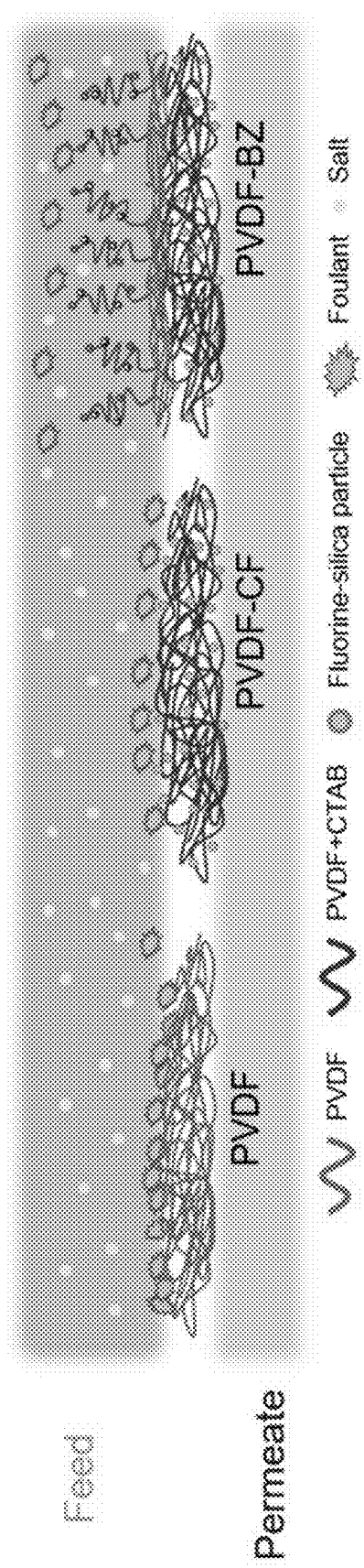
FIG. 2 is a schematic representation of a polyvinylidene difluoride (PVDF) membrane structure, a PVDF-CF membrane structure, and the PVDF-BZ membrane structure shown in FIG. 1.

FIG. 2 illustrates the electrospun membrane structures of a base electrospun PVDF membrane (PVDF), a base PVDF membrane with and omniphobic surface (PVDF-CF), and a bilayer electrospun PVDF membrane (PVDF-BZ). To prepare the base PVDF membrane, a 16 wt % PVDF-HFP solution in 7:3 DMF/acetone was prepared and stirred for 24 h at 35° C. The solution was degassed overnight at room temperature. Next, the solution was placed in a syringe with a stainless-steel needle. The syringe was placed in the syringe pump of the electrospinning apparatus. The flow rate and voltage were maintained at 1 mL min$^{-1}$ and 14 kV, respectively. The rotation speed of the collector drum was adjusted to 140 rpm, and the distance between the needle and the collector drum was kept at 15 cm. After spinning for 6 h, the membrane was removed from the aluminum foil that covered the collector drum and was air dried in a fume hood to evaporate the residual solvent.

The omniphobic PVDF-CF membranes were fabricated similarly to the base PVDF membranes using a two-step process. Initially, 50 mg of CTAB, a positively charged species, was added in the PVDF doping solution. Due to the high charge density of the polymer solution, 23 kV was applied during electrospinning. Next, a base PVDF layer was spun on top of the PVDV-CF structure. The spinning time for the PVDF-CF layer was 5.5 h, followed by 0.5 h for the base PVDF layer.

Membrane Modification

Figure 3:
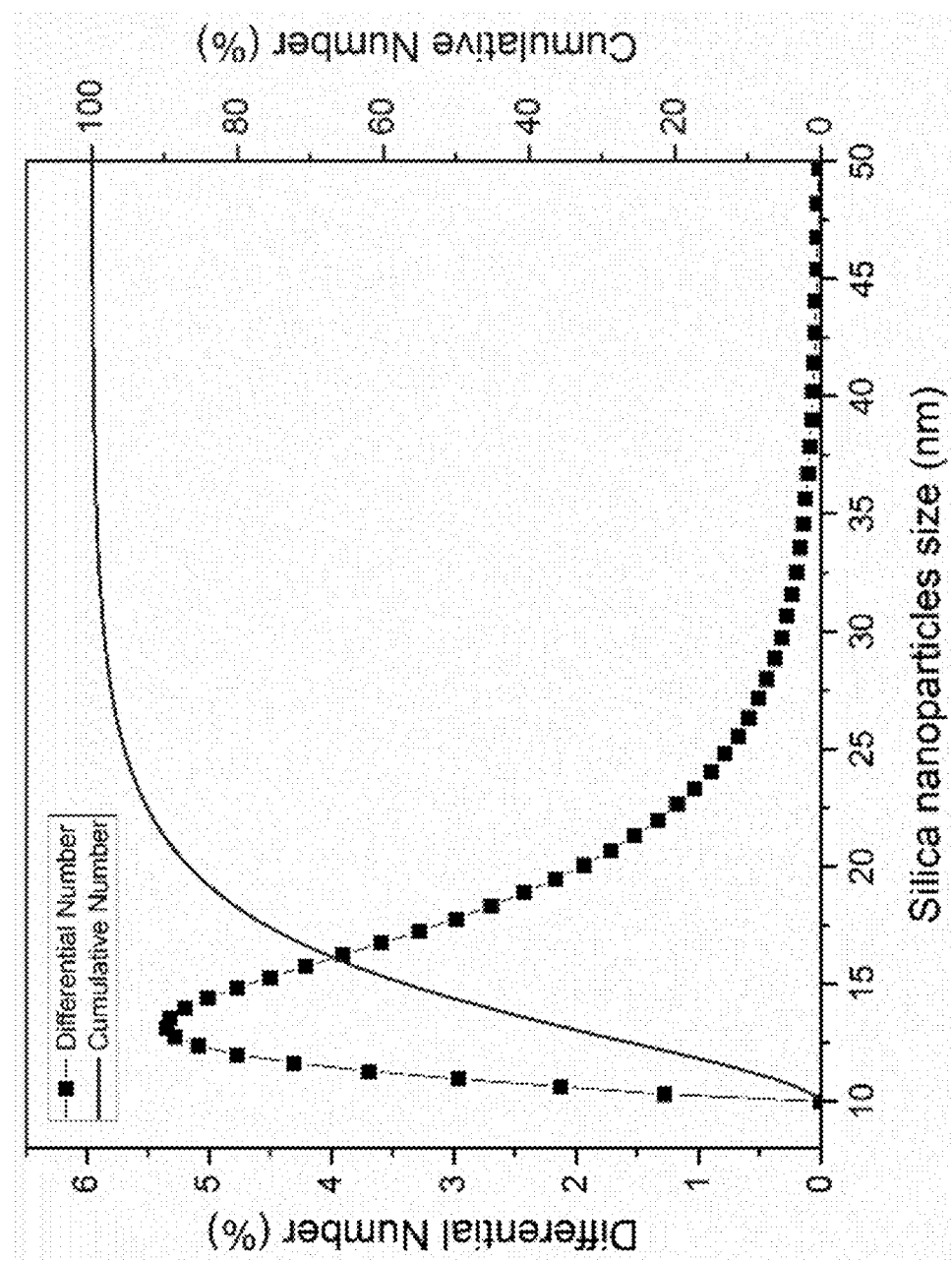
FIG. 3 is a graphical illustration of the distribution of silica nanoparticle size obtained using dynamic light scattering (DLS; Delsa™Nano, Beckman Coulter, Inc, Brea, Calif., USA).

Silica particles were grown on the PVDF-CF layer by electrostatic interaction using dip-coating. The PVDF-CF membrane was immersed in 0.2 wt % silica particles in acetate buffer solution (pH-4) for 1 h. The size of the silica nanoparticles was about 15.8±4.8 nm (FIG. 3). The membranes were gently rinsed using deionized (DI) water then air dried overnight. Next, the membrane was transferred to a 1 wt % FAS/hexane solution for 24 h.

Fabrication of the bilayer PVDF-BZ membrane was by alkaline treatment to generate hydroxyl surface functionality for zwitterionic grafting. The PVDF layer was placed in a 7.5 M sodium hydroxide (NaOH) solution for 30 min. Due to the hydrophobicity of the PVDF layer, the membrane floated on the solution during alkaline treatment. Next, the membrane was gently rinsed with DI water to remove any residual solution. Modification of the membrane with the zwitterionic polymer was performed by the "grafting to" method. Briefly, 100 ppm GS solution at 65° C. was prepared and the PVDF layer of the PVDF-BZ membrane was placed in the solution, enabling grafting of the GS polymer by reaction with the hydroxyl groups present.

Membrane Characterization

All membranes were rinsed with DI water and then dried before characterization. All membrane surfaces were characterized using attenuated total reflectance Fourier transform infrared spectroscopy (ATR-FTIR; Perkin Elmer Spectrum 100 FT-IR Spectrometer, Waltham, Mass., USA). Water, ethanol and underwater oil contact angles were determined (FIG. 4) (model OCA15EC, Future Digital Scientific, Garden City, N.Y., USA). These contact angles provided information on surface hydrophobicity, omniphobicity, and surface energy. Membrane morphology was determined using a scanning electron microscope (SEM; FESEM S-4800, Hitachi Co., Tokyo, Japan). Surface charge was determined by measuring surface streaming potential (SurPASS Electrokinetic Analyzer, Anton Paar, Ashland, Va., USA). The oil droplet sizes in the aqueous feed streams were determined by dynamic light scattering (Beckman Coulter, Brea, Calif., USA).

Membrane Performance

Membrane performance was determined using a custom laboratory-scale DCMD apparatus. The apparatus consisted of a membrane cell, two gear pumps, heating and cooling systems, a conductivity meter and a digital balance. The active membrane area in the PTFE membrane cell (Membrane Science Inc., Hsinchu, Taiwan) was 2 cm×4 cm (0.0008 m$^2$). Permeate flux and salt rejection were determined using a synthetic feed stream consisting of 3.5 wt % (35,000 ppm) NaCl. The feed tank, 0.8 L in volume, was maintained at 60° C. The permeate tank, 1 L in volume, contained deionized (DI) water at 20° C. Feed and permeate flow rates were maintained at 31.2 cm/s (Reynolds number (Re) is ~1435) and 12.7 cm/s (Re: ~584) using a gear pump (WT3000, Longer Pump, Tucson, Ariz., USA). For enhancing the flow distribution, a 0.23 cm-thick polypropylene spacer (Industrial Netting, Inc., Minneapolis, Minn., USA) was assembled on each side. The feed and permeate pressures were about 20.7 kPa and 17.2 kPa, respectively. A heat mantle was used to heat the feed solution, and a cooler was used to cool the permeate. The water flux, $J_w$, was measured by weight change of the permeate and recorded using a digital scale. Rejection, $R_{NaCl}$, was determined by conductivity (Cond 3310, WTW, Oberbayern, Germany) and calculated using Equation (1):

$$R_{NaCl}(\%) = \left(1 - \frac{\frac{V_p C_p}{J_w A_m t}}{C_f}\right) \times 100 \quad \text{Equation (1)}$$

where $V_p$ is the volume of permeate solution, $C_p$ is the salt concentration in the permeate, and $C_f$ is the salt concentration in the feed (3.5 wt % NaCl). $A_m$ is the active membrane area and t is time. Rejection values were determined over a 10 min time interval.

Antifouling and Antiwetting Investigation with Model Solutions

The antifouling test was performed using an oily saline solution. The 3.5 wt % NaCl solution was spiked with 1000 ppm crude oil (ONTA, Midland, Tex., USA). To obtain a homogeneous oily saline solution, the solution was mixed at 16,000 rpm for 30 min using the homogenizer (PT1300D, Kinematica Inc., Bohemia, N.Y., USA). The oil droplet size in the resulting solution was ~5 μm in a range of 1.3-9 μm and the oil volume fraction was ~0.0014 vol %, with no change in droplet size over 48 h. Nevertheless, the oil suspension was prepared immediately before starting the experiment. Permeate weight was recorded every 10 min.

The antiwetting properties of the membrane were investigated by challenging the membrane with a surfactant solution. In these experiments, the MD system was operated with the feedstock stream consisting of a base 3.5 wt % NaCl solution. The system was run for 2 h. Next, SDS was added such that specified concentrations of 0.1, 0.2, and 0.4 mM were obtained in the feed solution. The system was operated at each SDS concentration for 1 h. The permeate and conductivity were monitored every 10 min.

Finally, the system was tested with a 3.5 wt % NaCl solution containing 1000 ppm crude oil and 100 ppm SDS. The concentration of SDS was lower than the critical micelle concentration (8.2 mM). Flux and conductivity were recorded every 10 min.

Membrane Performance with PW

PW water samples were characterized at the Arkansas Water Resources Center, University of Arkansas. The results are given below in Table 1. The PW was heated to 60° C. before starting the experiment. For each experimental run, the volume of feed solution was 500 mL. The experiment was stopped at 40% water recovery or if the conductivity of the permeate increased above 300 μs/cm. The conductivity and permeate flux were determined and recorded continuously by the computer.

TABLE 1

Produced water (PW) analysis indicating main components.

| Parameter | Unit | Value |
|---|---|---|
| Total dissolved solids (TDS) | mg/L | 245,000 |
| Total organic carbon (TOC) | mg/L | 120 |
| Total suspended solids (TSS) | mg/L | 131 |
| Turbidity | NTU's | 6.0 |
| pH | — | 6.7 |
| Chloride | mg/L | 147,000 |
| Sulfate | mg/L | 478 |
| Boron | mg/L | 97.4 |
| Calcium | mg/L | 30,500 |
| Magnesium | mg/L | 5450 |
| Potassium | mg/L | 4330 |
| Sodium | mg/L | 55,900 |
| Conductivity | μS/cm | 323,000 |
| Total nitrogen | mg/L | 43.5 |

Physicochemical Properties of the Nanofibrous Membranes

These experiments focused on casting electrospun membranes, given their unique features: re-entrant and tunable morphology, high porosity, pore interconnectivity, surface roughness, and hydrophobicity. The surface chemistry of the membrane was modified to minimize penetration of low surface tension solutions through the membrane and adsorption of low surface energy compounds. In this study, the surface energy of the membrane was modified through FAS, as characterized by static contact angle analysis.

Figure 4A:
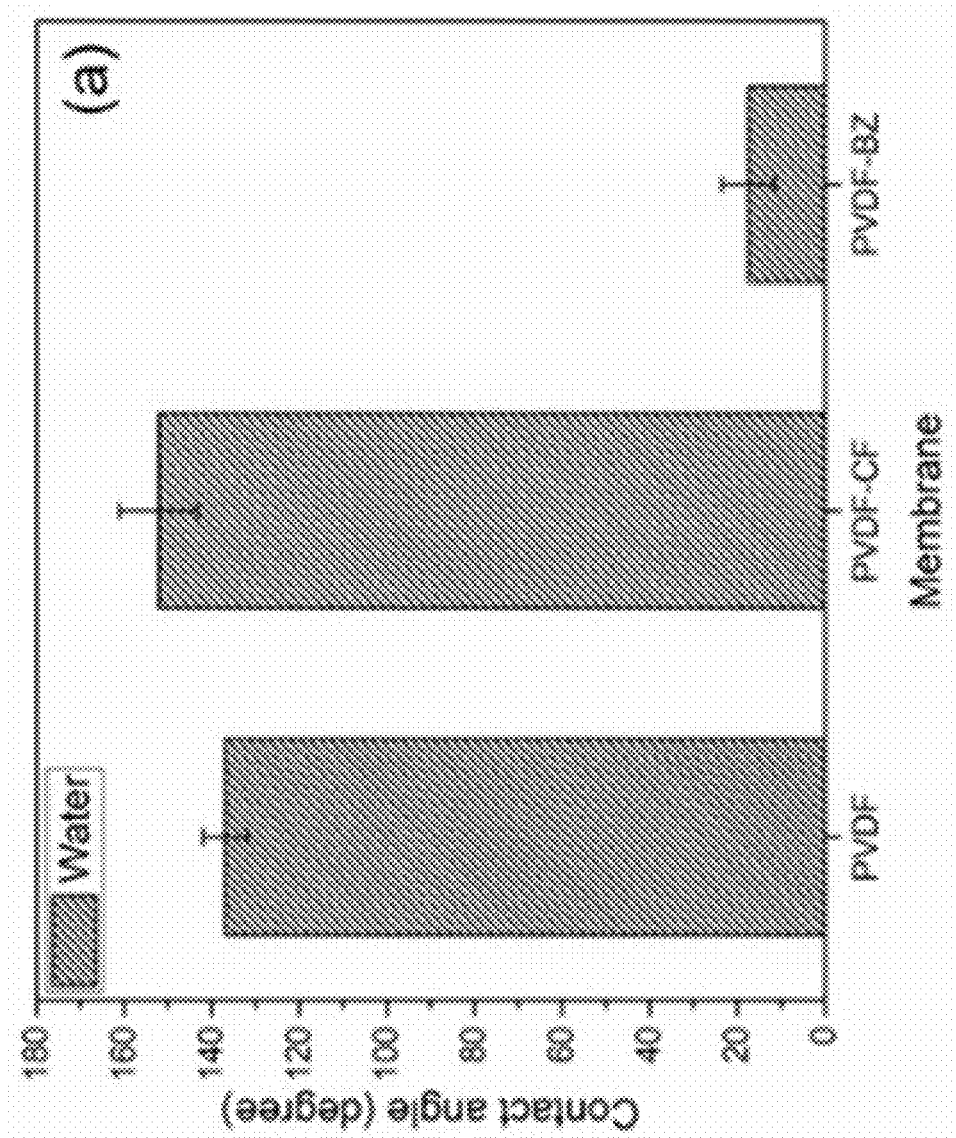
FIGS. 4A, 4B, and 4C are graphical representations of contact angles measured on the membrane surface with water (FIG. 4A), ethanol (FIG. 4B), and oil droplets (FIG. 4C), where each droplet volume was fixed in 5 μL, with a sessile droplet.
Figure 4B:
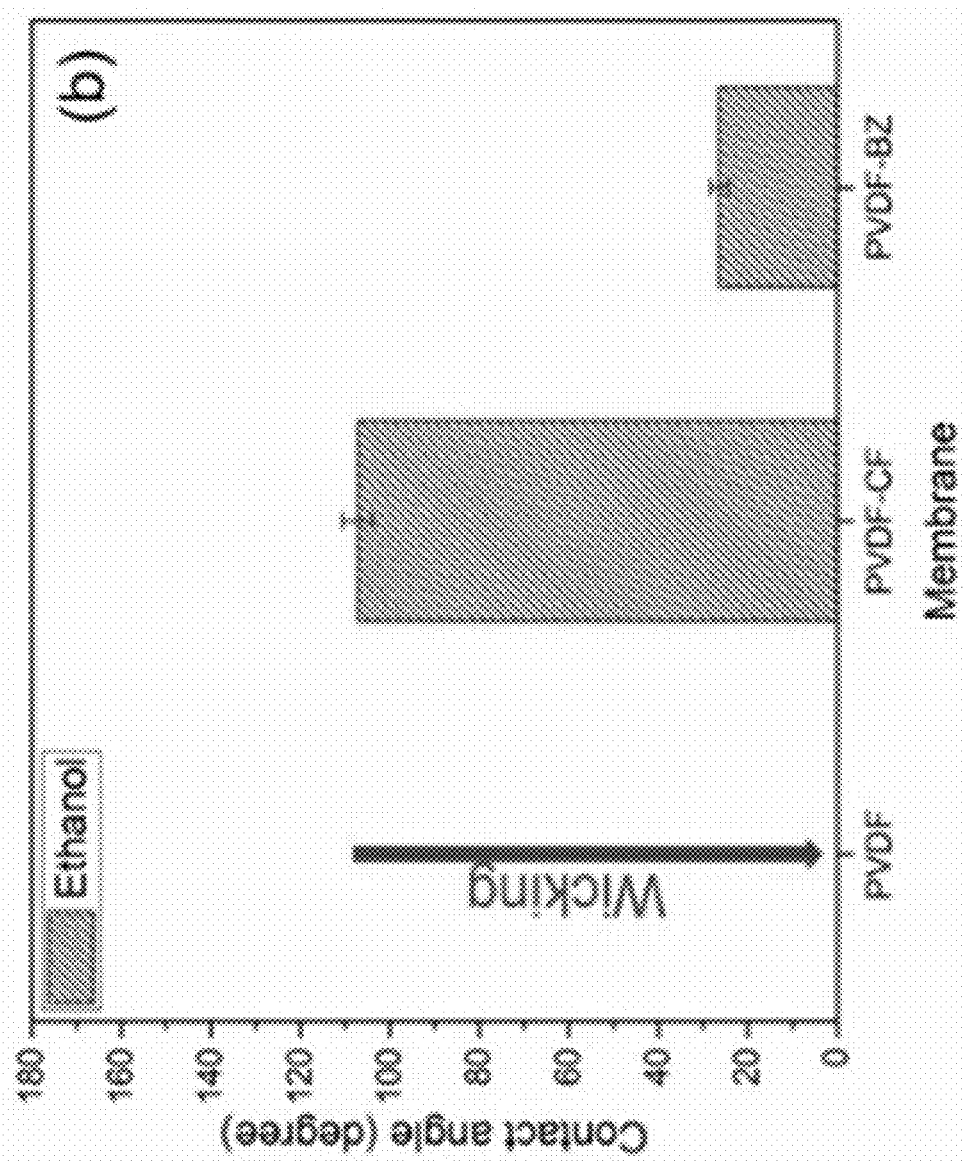
Figure 4C:
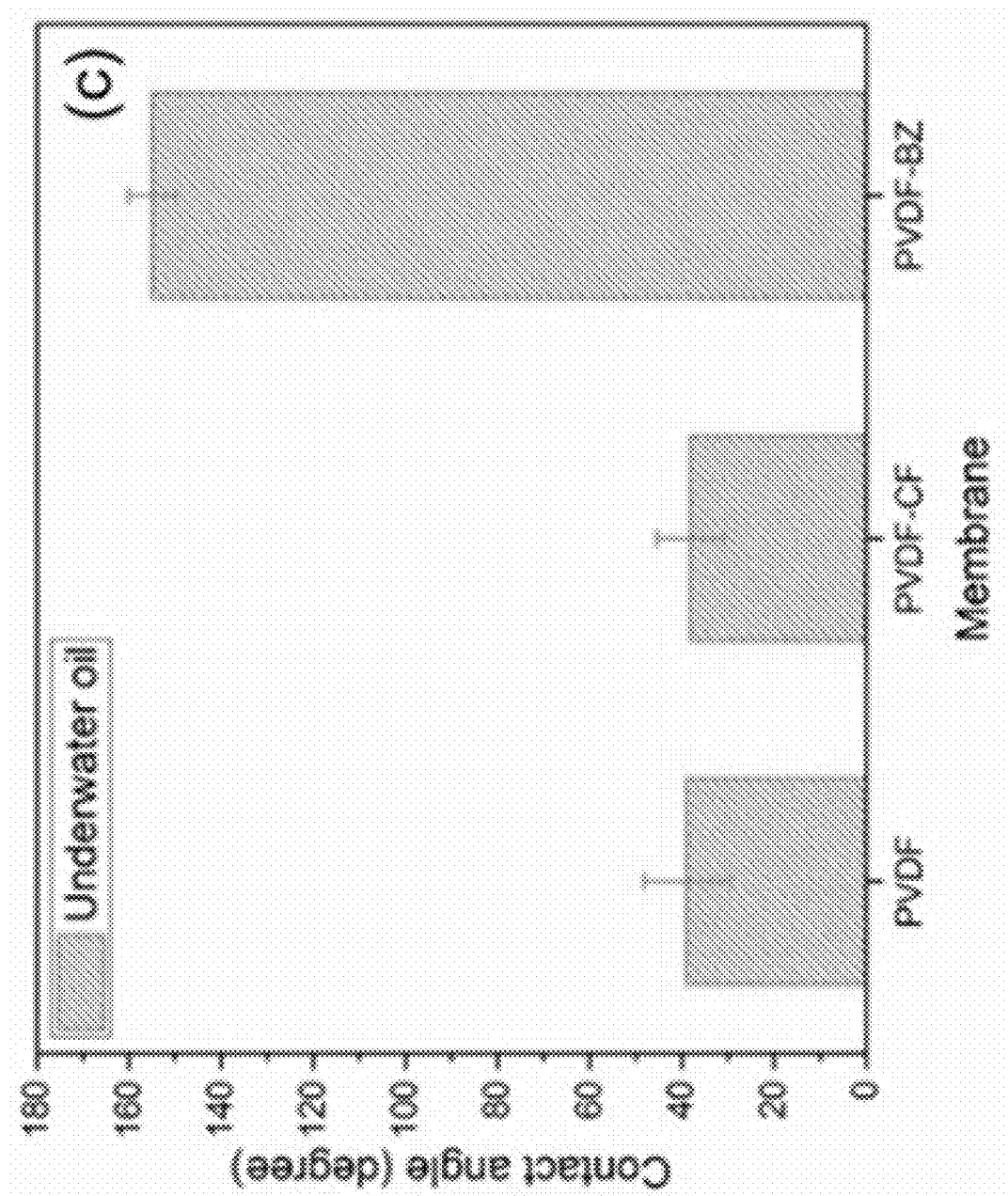

FIG. 4 shows the surface contact angle results. Three solutions were used to characterize the membrane surface: DI water ($\gamma$=72.8 mN/m) (FIG. 4A), ethanol ($\gamma$=22.4 mN/m) (FIG. 4B), and mineral oil ($\gamma$=30 mN/m) (FIG. 4C). The contact angle measurements confirmed that the unmodified PVDF membranes is hydrophobic (~140°) in air-contact angle due to unique electrospun fibrous structure. After alkaline treatment, the water contact angle decreased, which is attributed to hydroxy functional group generating on the membrane surface. The low energy fluorine-surface is superhydrophobic (~150°), and the air-water contact angle is a result of the Cassie-Baxter state (low-surface-energy material and re-entrant fibrous structure). The low energy fluorine surface is confirmed by the ethanol-air contact angle measurement (~110°) of the PVDF-CF membrane, where the ethanol droplet did not swell the membrane; on the contrary, the unmodified PVDF membrane showed fast wicking. The bilayer electrospun PVDF-BZ membranes disclosed herein, a superhydrophilic surface was created, which was attributed to a strong charged density hydrophilic polymer grafted on the surface.

In addition, to the in-air contact angles, the underwater oil contact angle was used to simulate actual operation when treating PW. The hydrophobic PVDF and PVDF-CF surfaces strongly attracted oil droplets due to hydrophobic-hydrophobic interactions. The adsorption of oil was suppressed by grafting pGS. Zwitterion coated surfaces have been used for forward osmosis, microfiltration, and ultrafiltration membranes. The zwitterionic moiety showed excellent oil/water separation performance due to the presence of a hydrophilic surface. The sulfonic group-modified surfaces led to the formation of a strong hydration layer, which enhanced the surface antifouling and oleophobic properties. From FIG. 4C, the PVDF-BZ surface is superoleophobic with an underwater contact angle of around 155°. Taken together, the contact angle measurements suggest that the PVDF-BZ membrane are ideally suited for treating PW water by MD.

Figure 5:
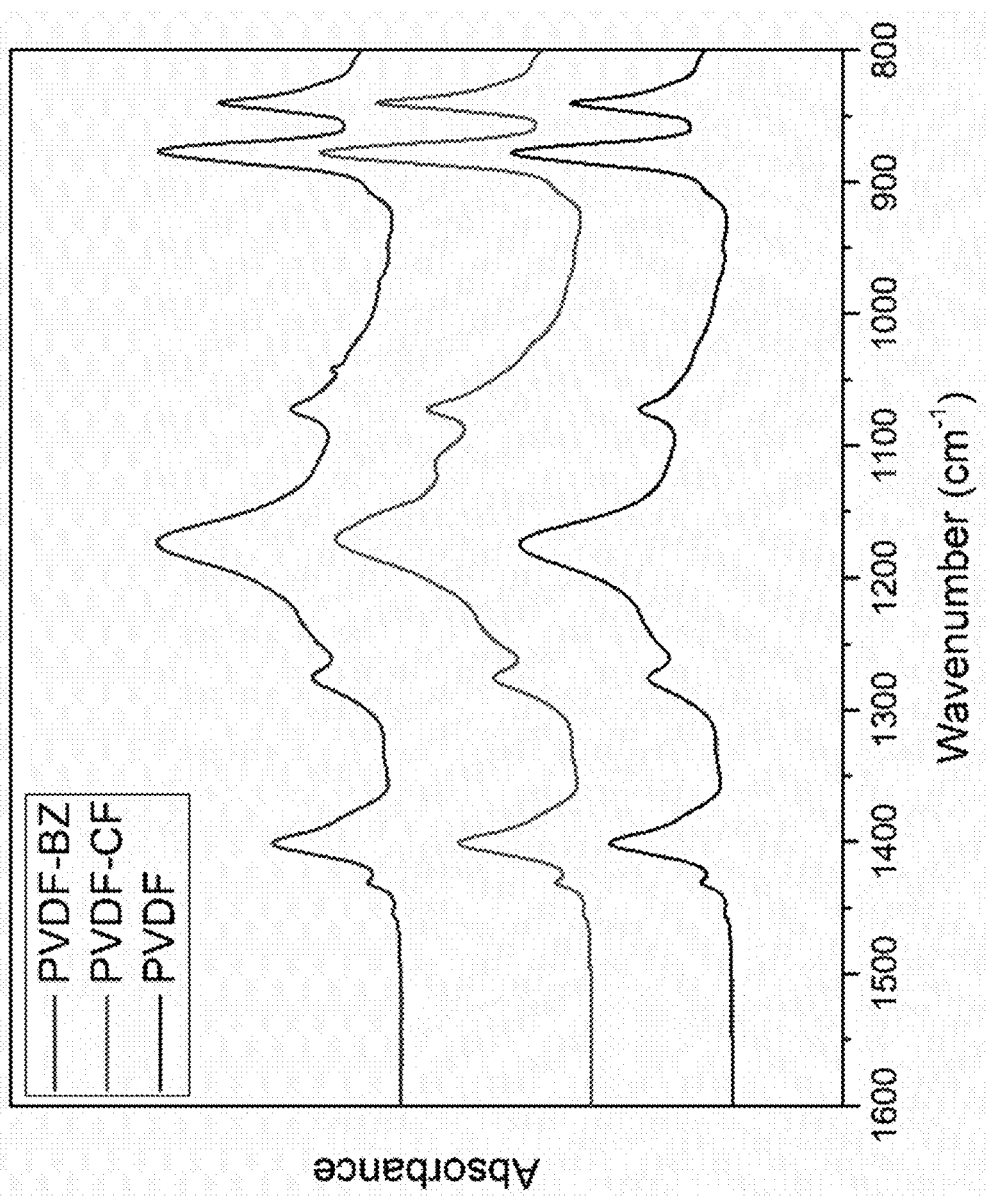
FIG. 5 is an ATR-FTIR spectra of unmodified PVDF and modified membrane, PVDF-CF and PVDF-BZ.
Figure 6:
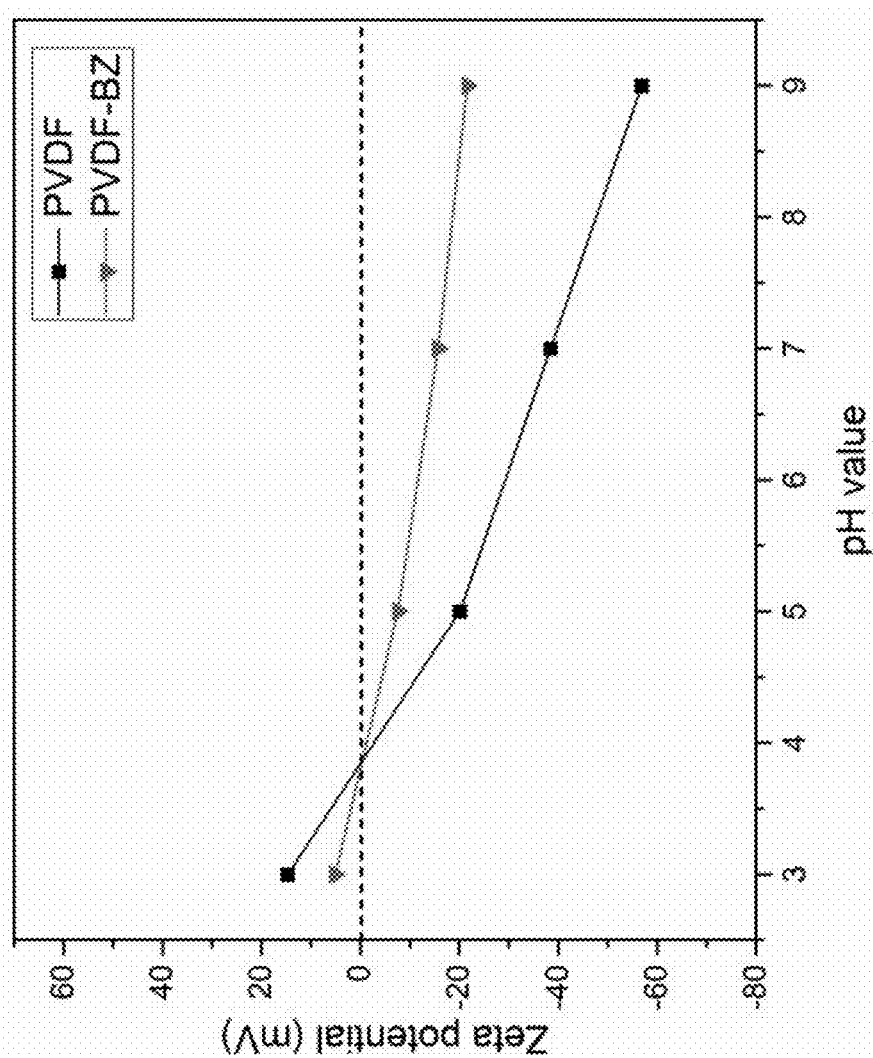
FIG. 6 is a graphical representation of the Zeta potential in different fluid phase pH.

The functional groups on the membrane surface were confirmed by ATR-FTIR. FIG. 5 shows the FTIR spectra in a range of 1600-800 cm$^{-1}$. The peaks around 1402 cm$^{-1}$ and 1070 cm$^{-1}$ on the PVDF membrane may be attributed to CH$_2$ and C—C—C, respectively. The new peak around 1110 cm$^{-1}$ on the PVDF-CF membrane corresponds to silanol groups, confirming that silica nanoparticles were successfully grown on the fiber surface through electrostatic adsorption. The presence of the fluorine coating on the PVDF-CF membrane cannot be verified, as the peak at 1170 cm$^{-1}$ represents CF$_2$ on the PVDF-CF as well as the fluorine present in the base PVDF membrane. Although it was not evident that FAS fluorinated the surface of the silica particles, the antiwetting behavior based on the ethanol contact angle suggests fluorination of the surface of the silica particles (FIG. 4). Finally, the small new peak on PVDF-BZ at around 1040 cm$^{-1}$ may be attributed to the SO3$^-$ of the zwitterionic polymer pGS. Thus, pGS grafting on to the surface of PVDF-BZ membrane is confirmed.

Figure 7:
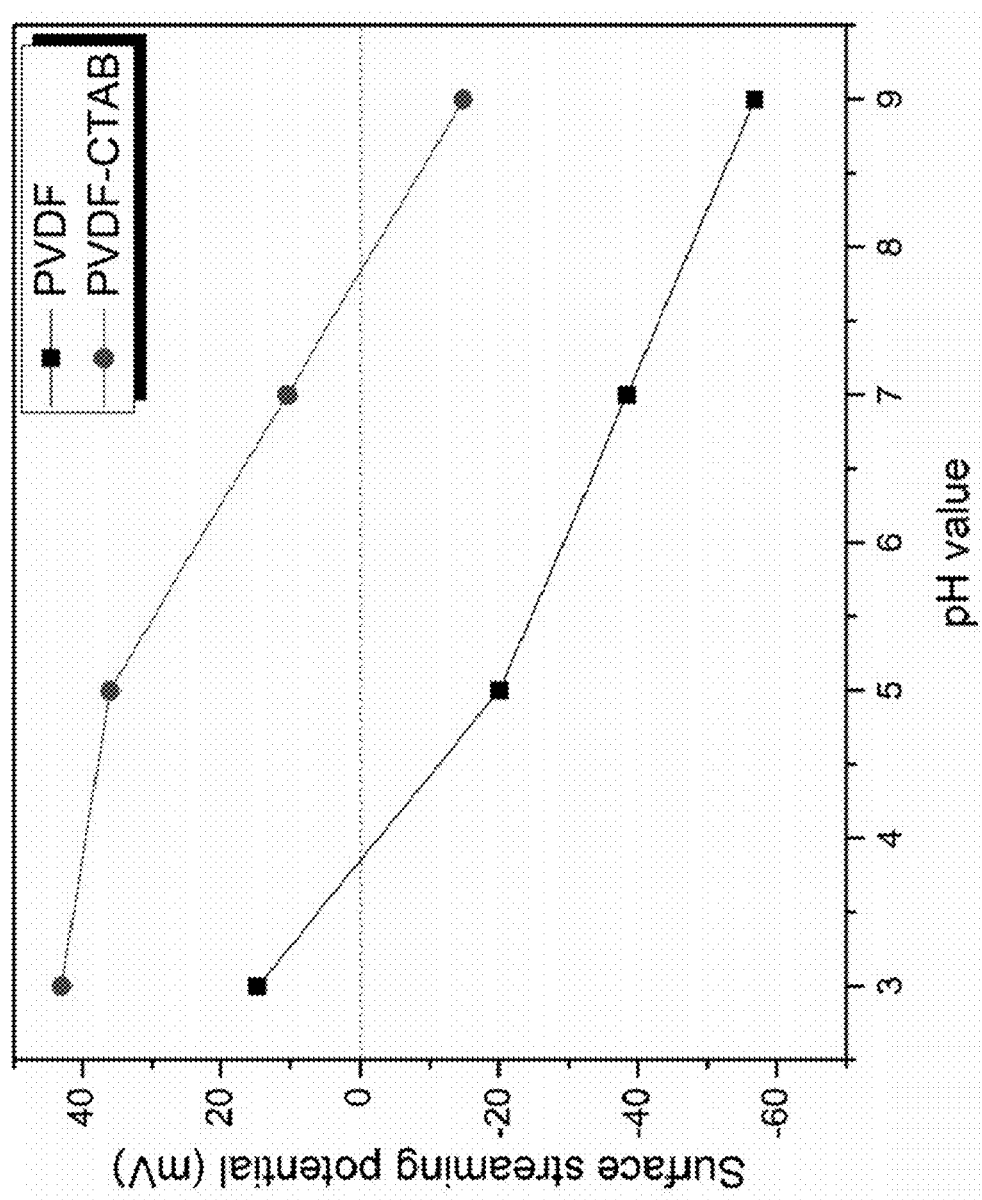
FIG. 7 is a graphical representation of the streaming potential analysis in different fluid phase pH.

Zeta potential analysis (FIG. 5) and stream potential analysis (FIG. 7) over the pH range from 3 to 9 was used to evaluate the membrane surface charge. To improve the antifouling property of the membrane, the zwitterionic polymer (GS) was grafted on the surface. The sulfobetaine methacrylate (SBMA) segment in the GS has a quaternary amine group followed by sulfonate group from the GS backbone. The surface charge of PVDF-BZ is still negative regardless of the positive moieties introduced by the SBMA. Although it is unlike pseudo-zwitterionic materials that can achieve zero, PVDF-BZ still approaches a neutral charge on the surface at low pH values. The results in FIG. 7 indicate that after blending the positive surfactant, CTAB, into the casting solution, the membrane indeed exhibited a more positive surface than the PVDF membrane.

Figures 8A, 8B, 8C:
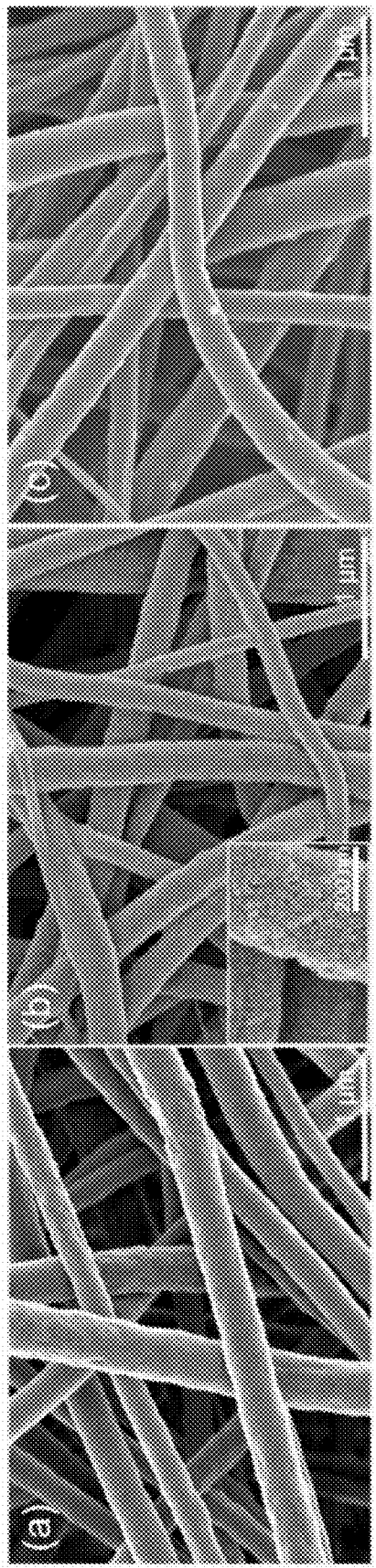
FIGS. 8A, 8B, and 8C are SEM images of the PVDF membrane (FIG. 8A), the PVDF-CF membrane (FIG. 8B), and the PVDF-BZ membrane (FIG. 8C), with the scale bar being 1 µm.

Development of fouling resistant MD membranes for treating PW requires a surface morphology that provides a kinetic barrier to the adsorption of low surface energy compounds. FIG. 8 is an SEM image of the PVDF membrane (FIG. 8A), the PVDF-CF membrane (FIG. 8B), and the PVDF-BZ membrane (FIG. 8C). The re-entrant fiber structure is clearly seen. The thickness of the PVDF, PVDF-CF, and PVDF-BZ membranes was 115±10.8, 133.3±12.5, and 138.3±1 0.3 μm, respectively, as measured by a digital caliper (E-Base, Yunlin, Taiwan). The fiber diameter of the PVDF membrane is 393±49 nm, which is larger than PVDF-CF (262±31 nm). This is most likely due to the presence of CTAB in the doping solution, which increases the charge density of the solution. This in turn required the use of a higher voltage during the electrospinning process to overcome the solution surface tension, create a Taylor cone, and draw out the nanofiber, which will be thinner. The nanoparticles on the PVDF-CF membrane (FIG. 8B) are clearly visible. The size of a single nanoparticle is ~15 nm, matching the results obtained from DLS (FIG. 3). Moreover, the superhydrophobic and omniphobic surface (FIG. 4) was attributed to the re-entrant structure of the PVDF-CF membrane. The zwitterionic grafted nanofiber on the PVDF-BZ membrane surface displays some small dots, which represent the coated GS polymer. The size of the dots was between 13.5 nm and 27.3 nm. These morphologies will change the surface and physicochemical properties and simultaneously alter the intrinsic membrane performance.

Intrinsic Membrane Performance

Figure 9:
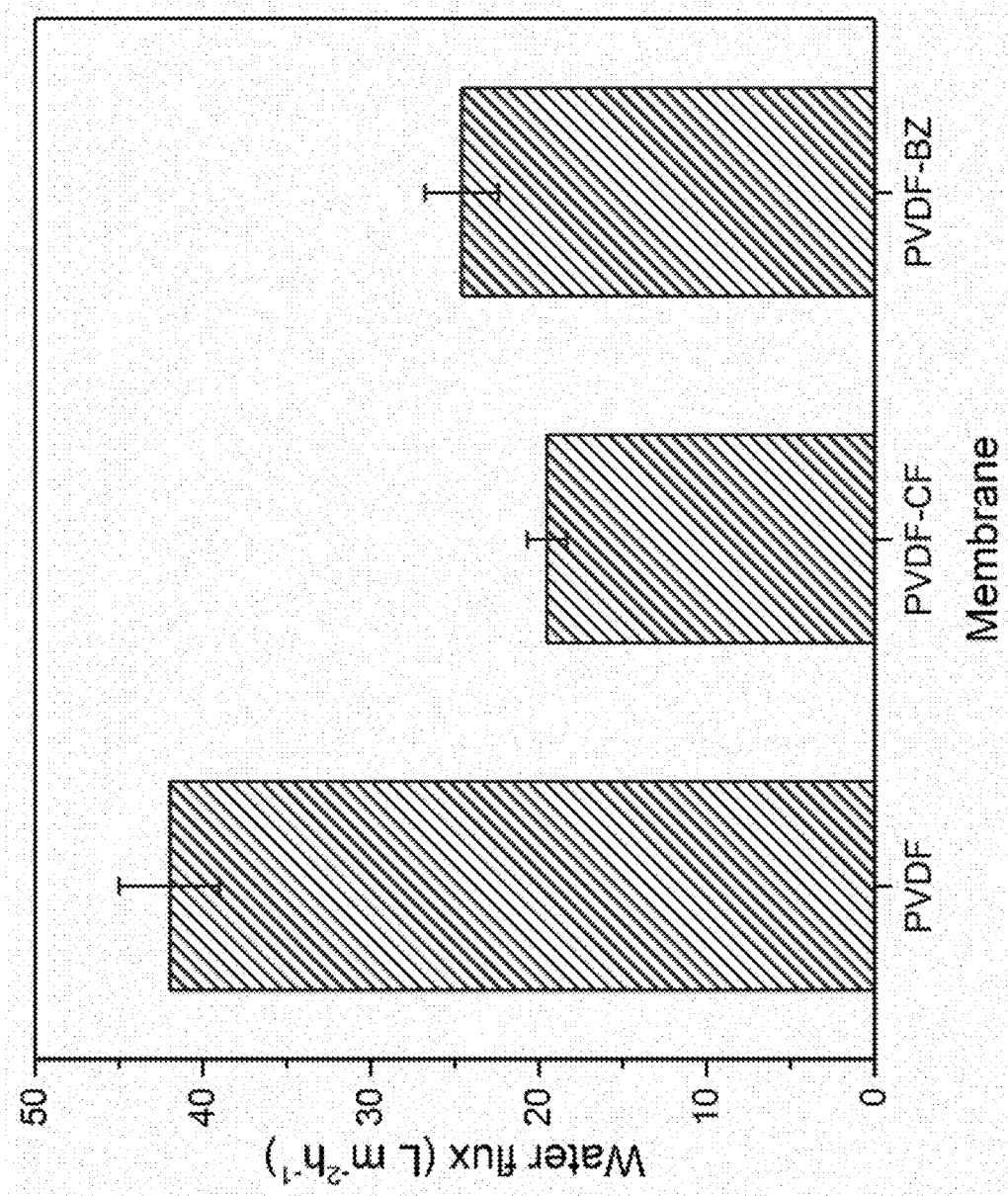
FIG. 9 is a graphical representation of permeate flux for PVDF, PVDF-CF, and PVDF-BZ membranes challenged with a feed stream consisting of a 3.5 wt % NaCl solution. The temperature of the feed and permeate streams was 60° C. and 20° C., respectively. The error bars represent the range of triplicate results.

The permeate flux result is shown in FIG. 9, for a feed stream consisting of a 3.5 wt % NaCl solution. The flux for the PVDF membrane is 42±2.99 Lm$^{-2}$ h$^{-1}$. As can be seen, there is higher flux for the PVDF-CF membrane (19.5±1.16 Lm$^2$ h$^{-1}$) and the PVDF-BZ membrane (24.6±2.19 Lm$^{-2}$ h$^{-1}$). A unique feature of electrospun membranes is the presence of a highly interconnected porous mat structure. The highly interconnected porous channels provide a large number of paths for vapor transport, and hence high permeate fluxes.

The PVDF-CF membrane has a lower flux than the PVDF and PVDF-BZ membranes due to the presence of smaller diameter fibers, leading to smaller vapor channels. In addition, the presence of FAS nanoparticles on the fiber surface further restricts the channel diameter. The zwitterion functionalized PVDF-BZ membrane displays a slightly increased flux compared to the PVDV-CF membrane. This is most likely due to the presence of a hydrophilic membrane surface that faces the feed solution. Importantly, salt rejection for all three membranes was above 99.9%. Thus, the presence of a thin hydrophilic membrane surface that faces the feed stream does not influence the salt rejection of the PVDF-BZ membrane.

Antiwetting and Antifouling Behavior

Figure 10A:
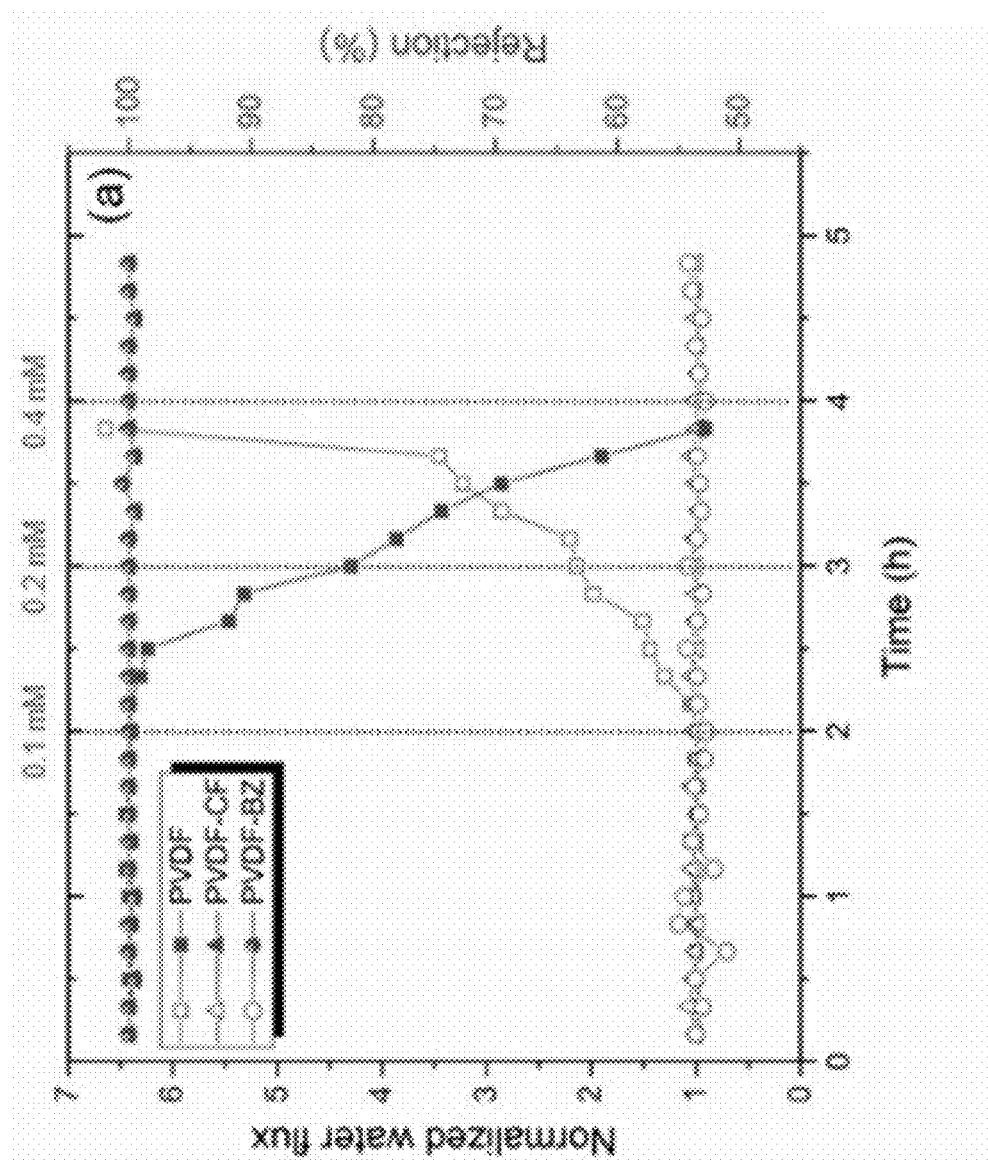
FIGS. 10A, 10B, and 10C graphically illustrate the effect of SDS and crude oil in the feedstock on membrane performance (FIG. 10A), an antiwetting test of the MD membranes using a range of SDS concentrations (FIG. 10B), and an antifouling test using 1000 ppm crude oil suspension with/without surfactant solution (FIGS. 10B and 10C). The feed and permeate flow rates were 0.86 and 0.35 mL/min, respectively.
Figure 10B:
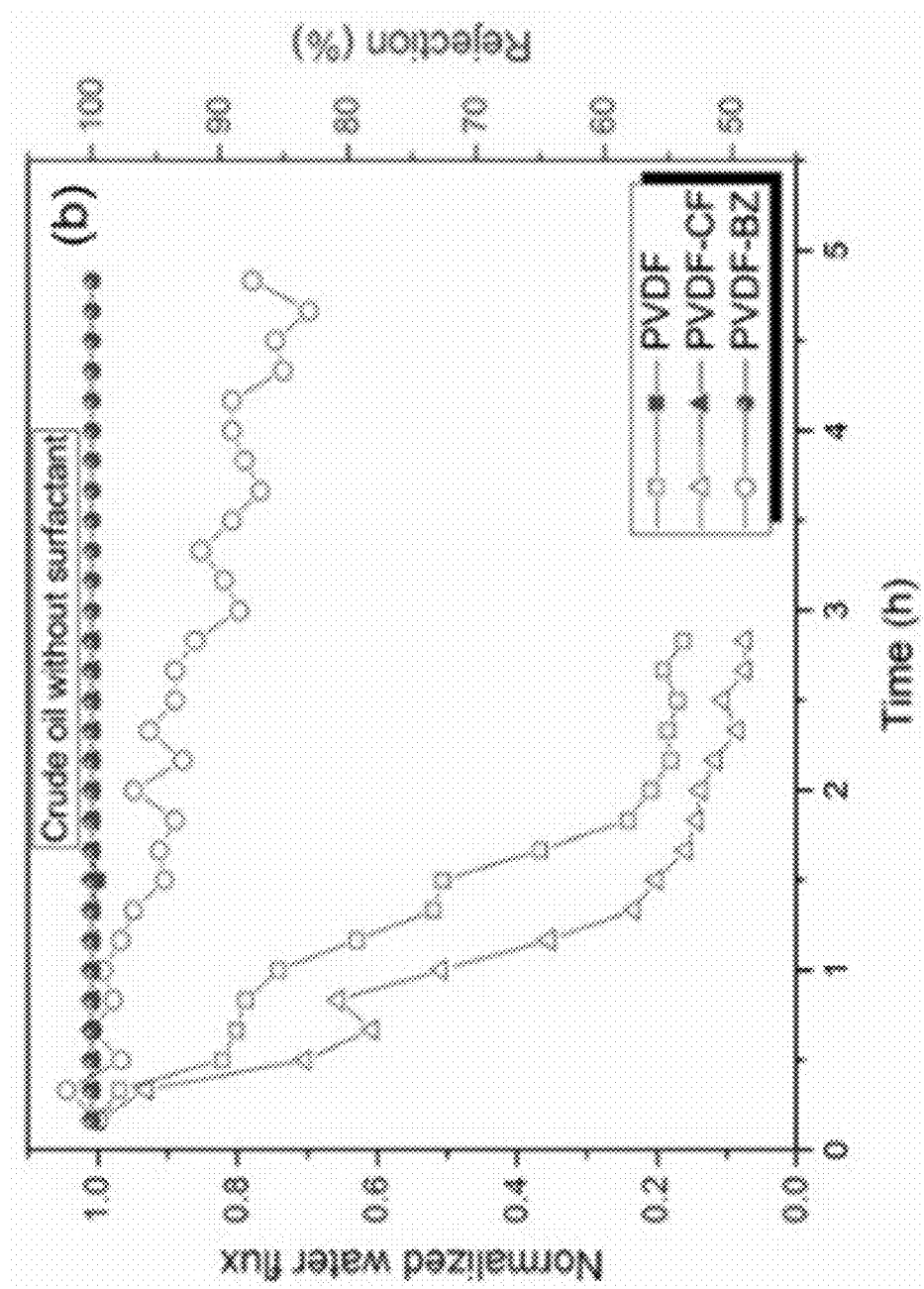

These experiments evaluated an unmodified electrospun PVDF membrane, an electrospun membrane modified only with CTAB and the fluorine-silica nanoparticles (PVDF-CF), and the bilayer electrospun membrane with the fluorine nanoparticles and the zwitterionic polymer (PVDF-BZ). To test the antiwetting properties of the membrane, SDS was used as a model amphiphilic agent to induce membrane wetting. The results are shown in FIG. 10. The MD was run for 2 h using a 3.5 wt % NaCl feed solution containing increasing concentrations of SDS from 0.1 to 0.4 mM. To compare the change in flux during MD, the flux has been normalized by dividing by the initial flux over the first 10 min of operation. As expected, the PVDF membrane was rapidly wet by the SDS-containing feed solution. The flux for the PVDF membrane increased above 600% with 0.4 mM SDS present in the feed. The corresponding salt rejection decreased, indicating wetting of the membrane and direct passage of the feed through the membrane pores. The PVDF-CF and PVDF-BZ membranes, however, maintained 99% salt rejection during the entire test. In the case of the PVDF-BZ membrane, we note that the presence of a thin hydrophilic layer facing the feed stream did not lead to wetting.

To test the fouling resistance of the membrane, crude oil was added to the NaCl feed stream. The PVDF and PVDF-CF membranes displayed rapid water flux decline within 3 h (FIG. 10B), which was attributed to the hydrophobic attraction between the oil droplet and the membrane. The underwater oil water contact angles support this observation (FIG. 4C). However, as the PVDF-BZ membrane contains a thin hydrophilic zwitterionic surface layer that contacts the feed stream, this suppresses the adsorption of oil. A significant improvement in flux was observed. The flux was above 70% of the normalized water flux during 5 h of operation. This is due to the superoleophobic surface that was created by the zwitterionic layer on the membrane surface that faces the feed solution. It is important to note that all three membranes maintained a salt rejection over 99%.

Figure 10C:
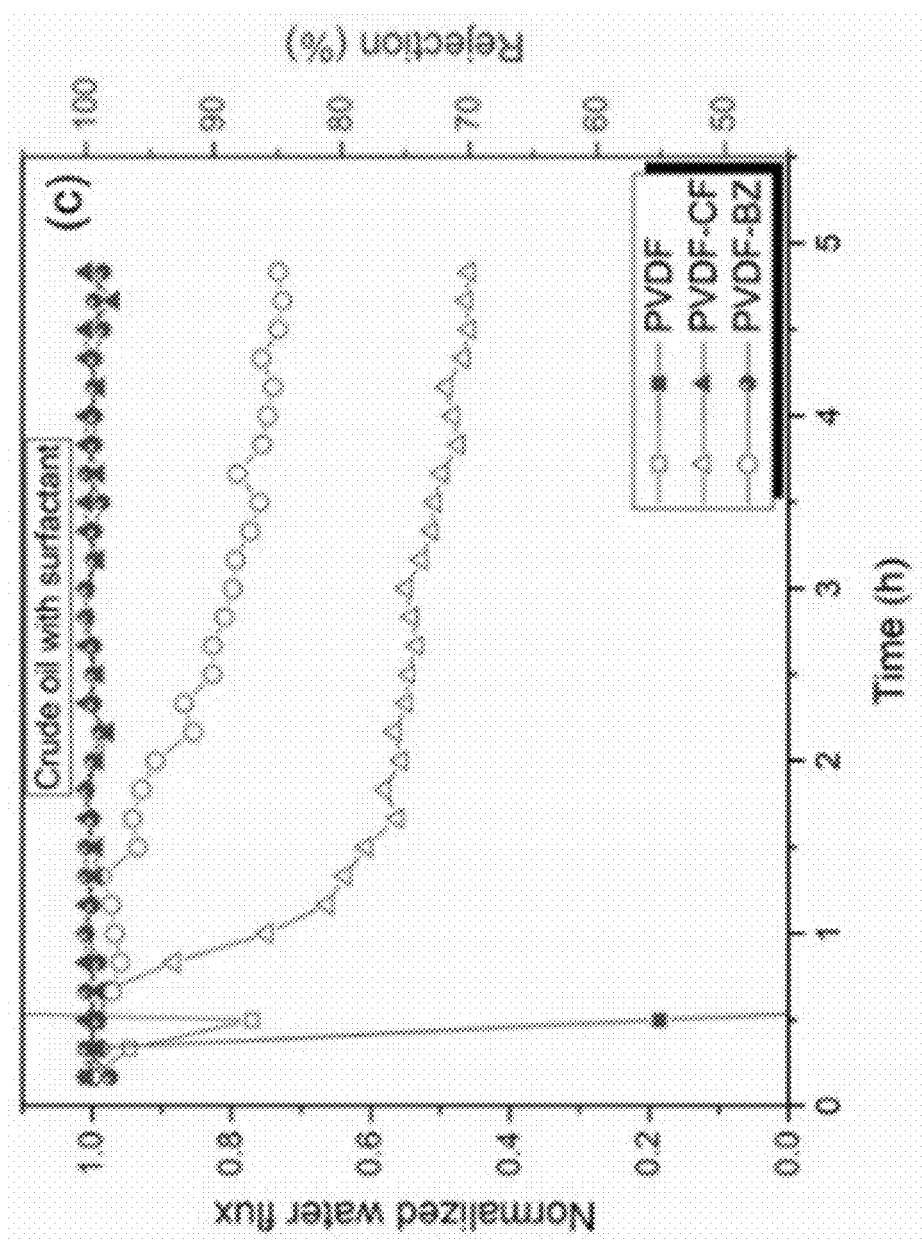

The membranes were tested with a 3.5 wt % NaCl solution containing 1000 ppm crude oil with 100 ppm SDS. The results are shown in FIG. 10C. The unmodified PVDF membrane showed a rapid decrease in flux due to fouling by the oil, and then a rapid increase in flux and decrease in rejection due to wetting. The combined effect of the oil and SDS led to rapid membrane failure. The PVDF-CF membrane resisted wetting and maintained a salt rejection above 99% though adsorption of the oil, which led to fouling and a decrease in flux. Additionally, due to most of the oil being stabilized by SDS, the flux reduction was more moderate than in the absence of SDS. The same phenomena can explain the reduction in permeate flux for the PVDF-BZ membrane. However, the presence of a hydrophilic surface layer suppressed fouling, leading to a higher water flux than the PVDF-CF membrane. Consequently, PVDF-BZ is a promising MD membrane for treating high-saline oily wastewater as it showed an excellent salt rejection and antifouling properties simultaneously.

Treating PW

Figure 11A:
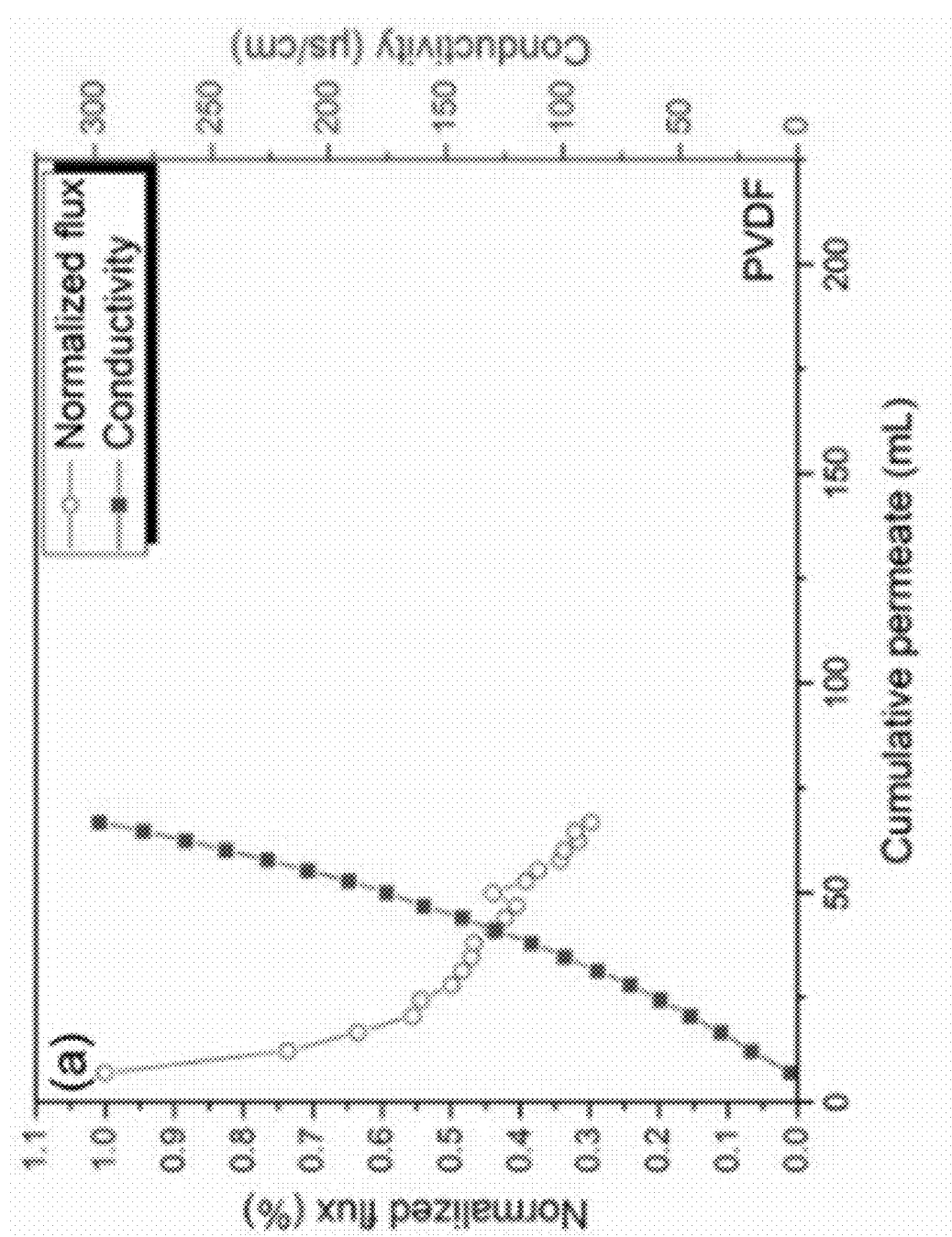
FIGS. 11A, 11B, and 11C graphically illustrate flux and salt rejection for a produced water (PW) feed stream on a PVDF membrane (FIG. 11A), a PVDF-CF membrane (FIG. 11B), a PVDF-BZ membrane (FIG. 11C). The target water recovery was setup at 40%, or 200 mL permeate. The initial fluxes were PVDF membrane: 38.88 $Lm^{-2} h^{-1}$ (FIG. 11A), PVDF-CF membrane: 16.83 $Lm^{-2} h^{-1}$ (FIG. 11B), and PVDF-BZ membrane: 18.43 $Lm^{-2} h^{-1}$ (FIG. 11C).
Figure 11B:
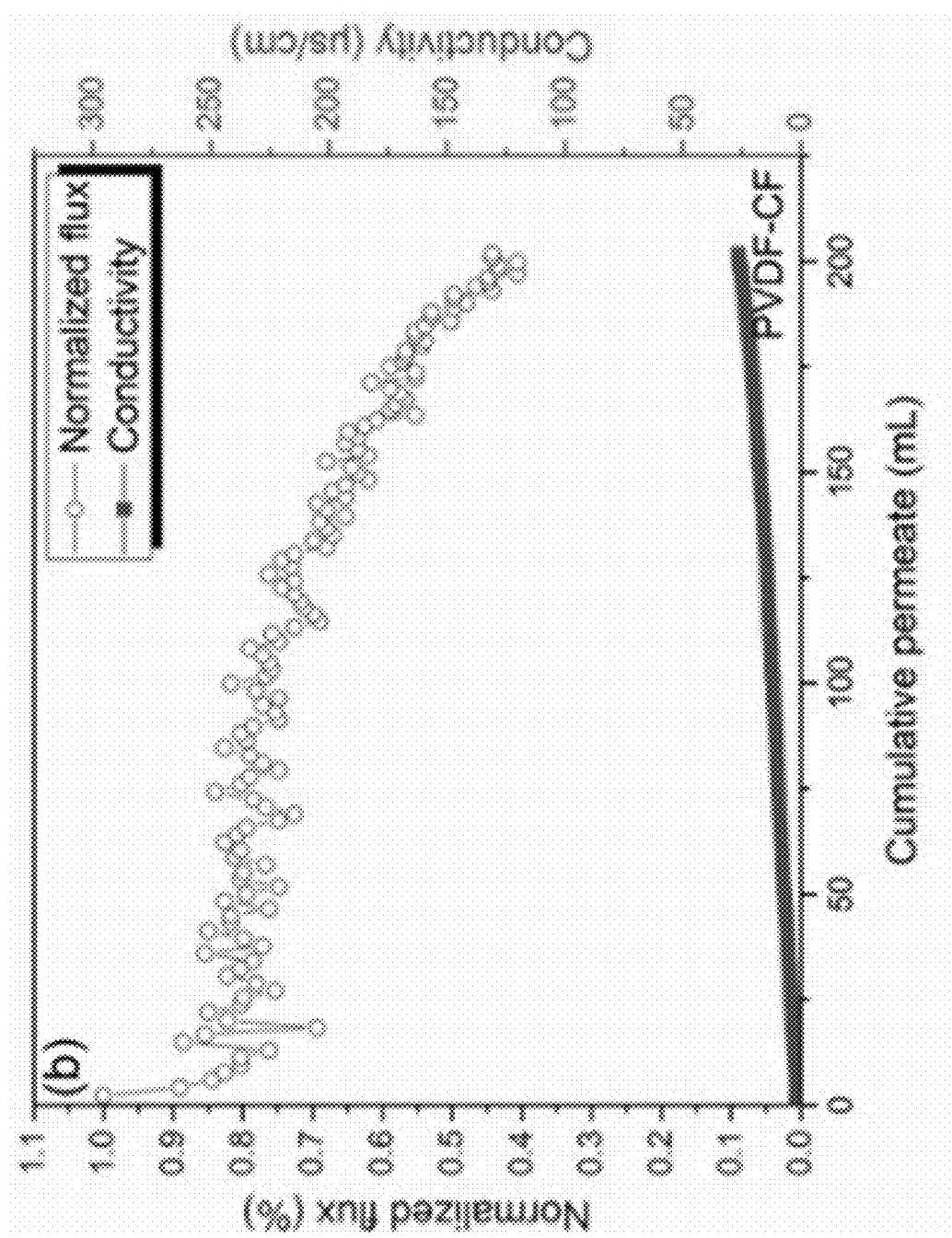
Figure 11C:
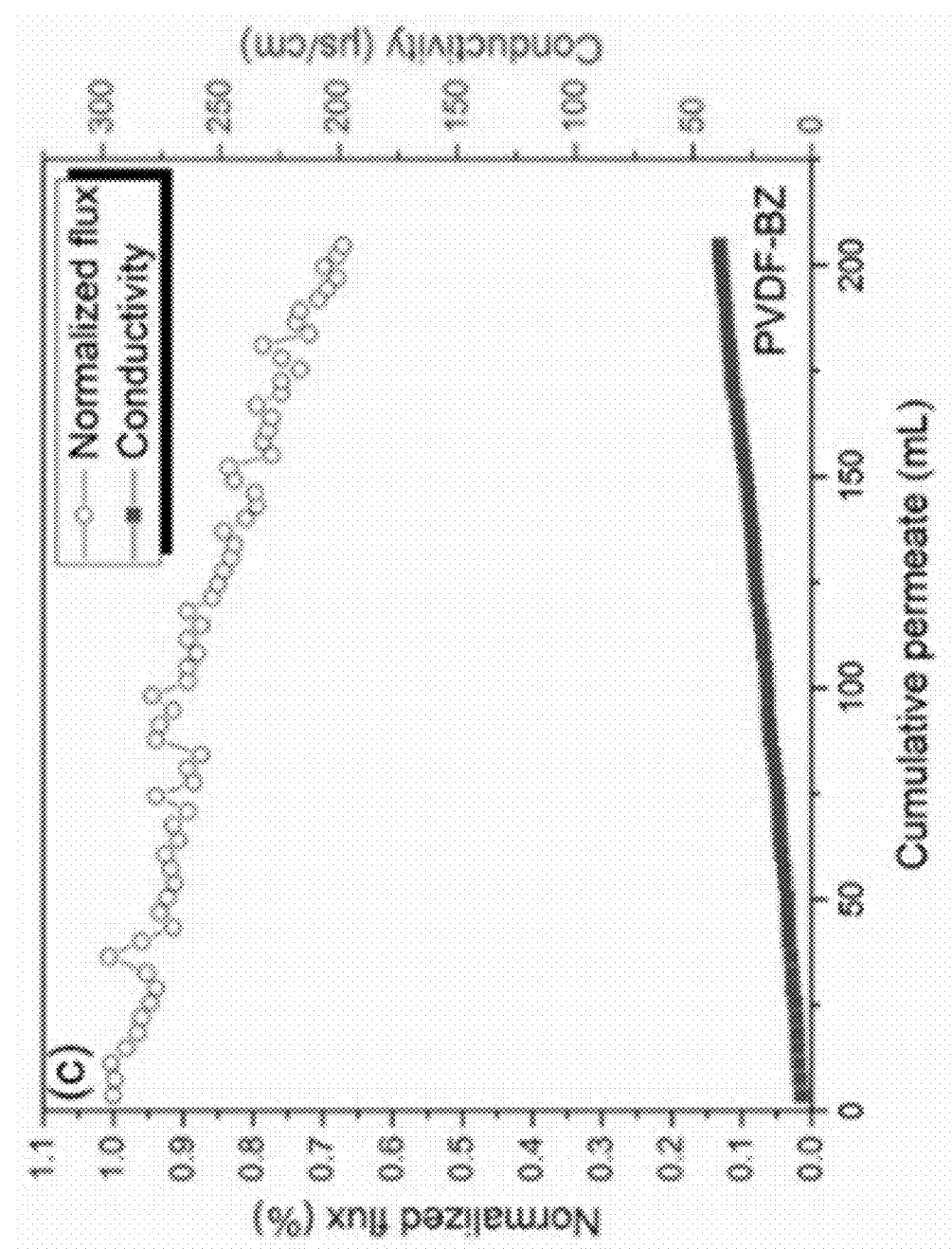

The membranes were challenged with PW. Real PW is far more complex than the synthetic feedstocks used to validate membrane performance. The TDS of the PW was 245,269 ppm, which is much higher than 3.5 wt % (35,000 ppm) NaCl used as the model feed solution. In addition, the PW contains oil and grease, forming agents, surfactants, etc. which are far more challenging to membrane stability. The results of the PW analysis are given in Table 1 above. The normalized permeate flux (normalized by dividing by the initial flux over the first 10 min of operation) for the PVDF membrane (FIG. 11A) declined rapidly to 0.3 before 70 mL of permeate had been collected, indicating rapid fouling of the membrane. In addition, the conductivity of the permeate increased rapidly, indicating pore wetting and passage of the feed directly to the permeate. These observations are in keeping with the results of the model feed streams. However, the degree of fouling is much greater due to the presence of a large number of organic foulants in the PW. The results indicate that the model feed streams developed here may be used when optimizing membrane properties.

In contrast, results for the PVDF-CF and PVDF-BZ membranes indicate a much slower increase in permeate conductivity, which may be attributed to the low surface energy and hierarchical re-entrant structure of the substrate, which suppresses wetting. Importantly, the decrease in permeate flux is much less for the PVDF-BZ membrane, indicating a much stronger resistance to fouling by the hydrophilic surface that faces the feed stream. Consequently, the productivity (amount of PW treated) by the PVDF-BZ membrane was greater the PVDF-CF membrane.

Membranes can be Cleaned and Reused

Figure 12A:
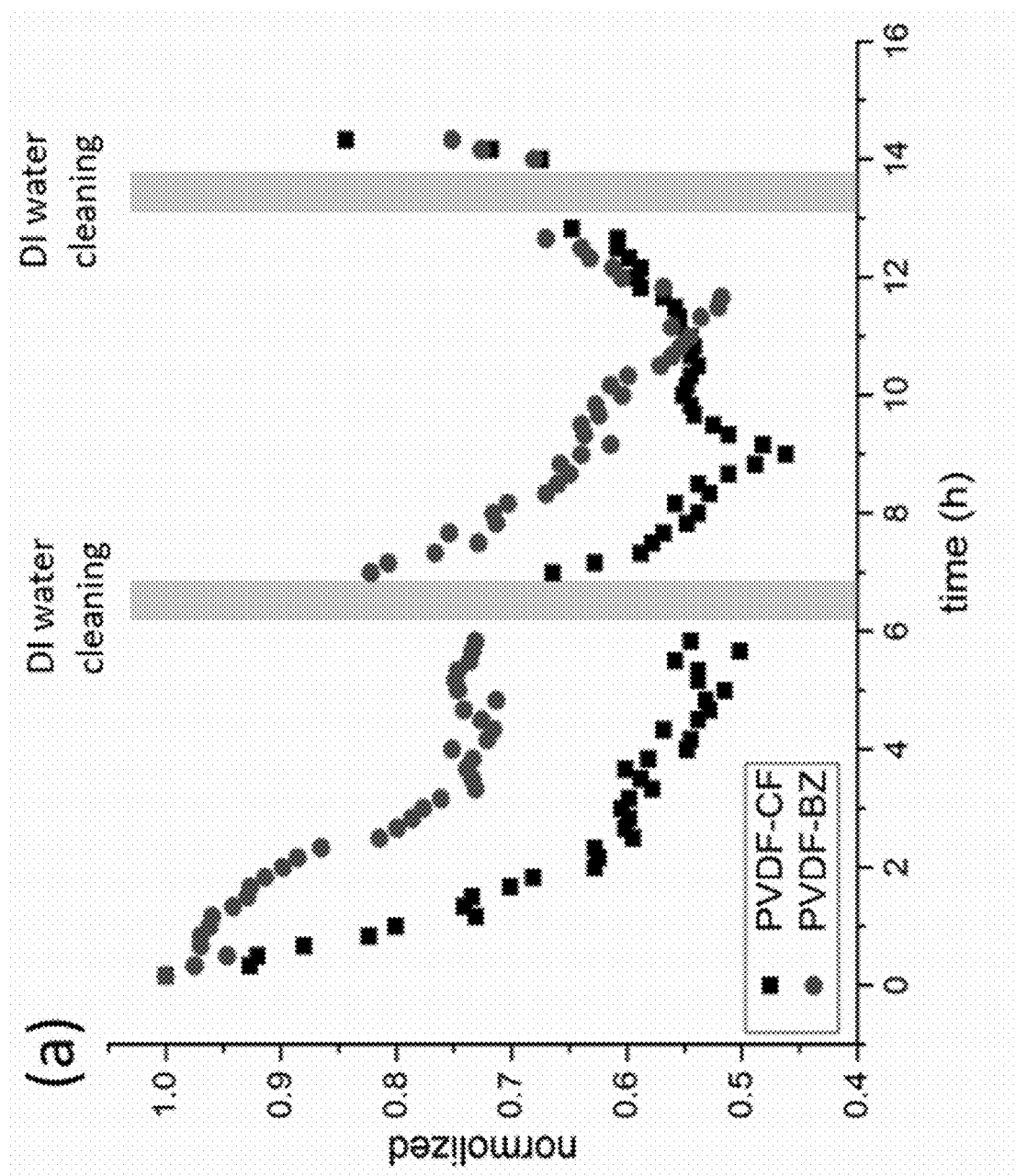
FIGS. 12A and 12B graphically illustrate regeneration test results of PVDF-CF (black symbol) and PVDF-BZ (red symbol) for normalized water flux (FIG. 12A) and conductivity in the permeate tank during long-term crude oil suspension solution treatment (FIG. 12B).
Figure 12B:
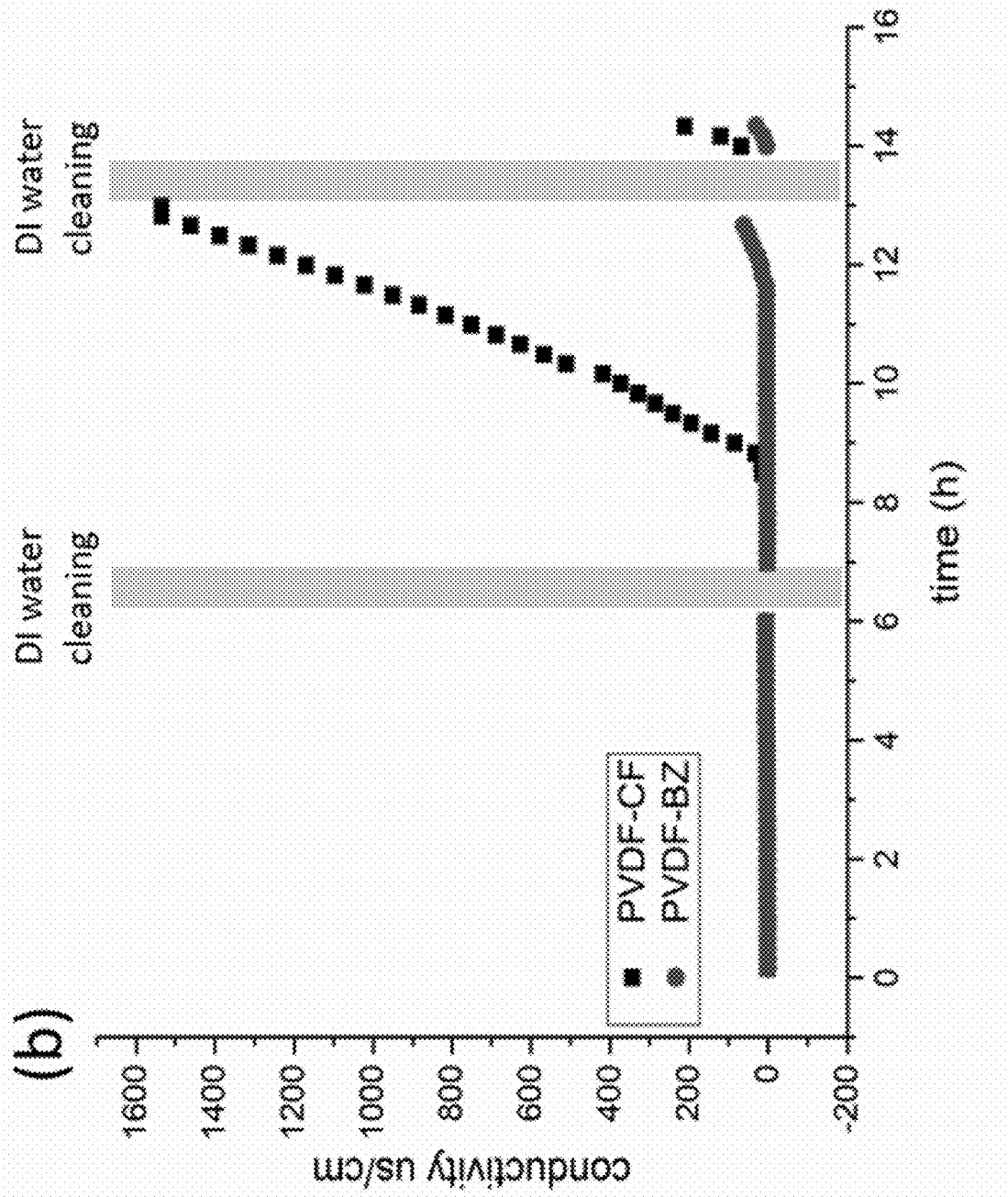

For membrane regeneration testing 100 ppm crude oil suspension was used as a fouling solution. Three-cycle tests were performed for PVDF-CF and PVDF-BZ and each cycle contained a 6 h filtration and 1 h cleaning period. The regeneration results are shown in FIG. 12. PVDF-BZ had higher normalized flux than omniphobic PVDF-CF membrane though the membrane failed in cycle 2. These results still present a better antifouling character of the bilayer membrane, PVDF-BZ than PVDF-CF though the membrane failed in cycle 3. However, 100 ppm crude oil high oil suspension without surfactant is an extreme feed stream for the membrane treatment. We tested the membrane using simulated produced water without inorganic components (FIG. 13) and without organic components (FIG. 14).

Figure 13A:
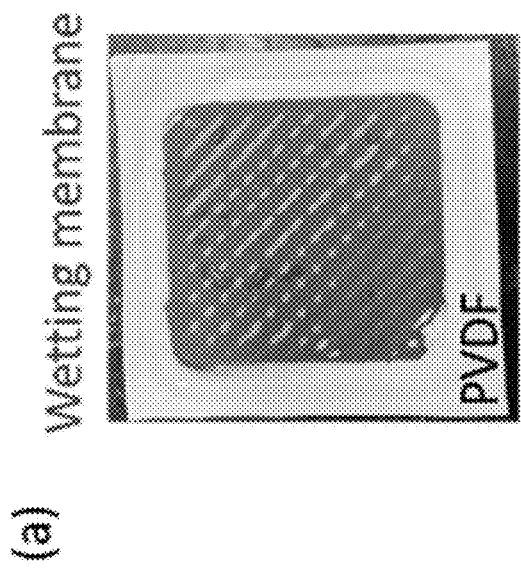
FIGS. 13A, 13B, and 13C illustrate regeneration test results of synthetic produced water without inorganic components for PVDF (FIG. 13A), PVDF-CF (FIG. 13B), and PVDF-BZ (FIG. 13C).
Figure 13B:
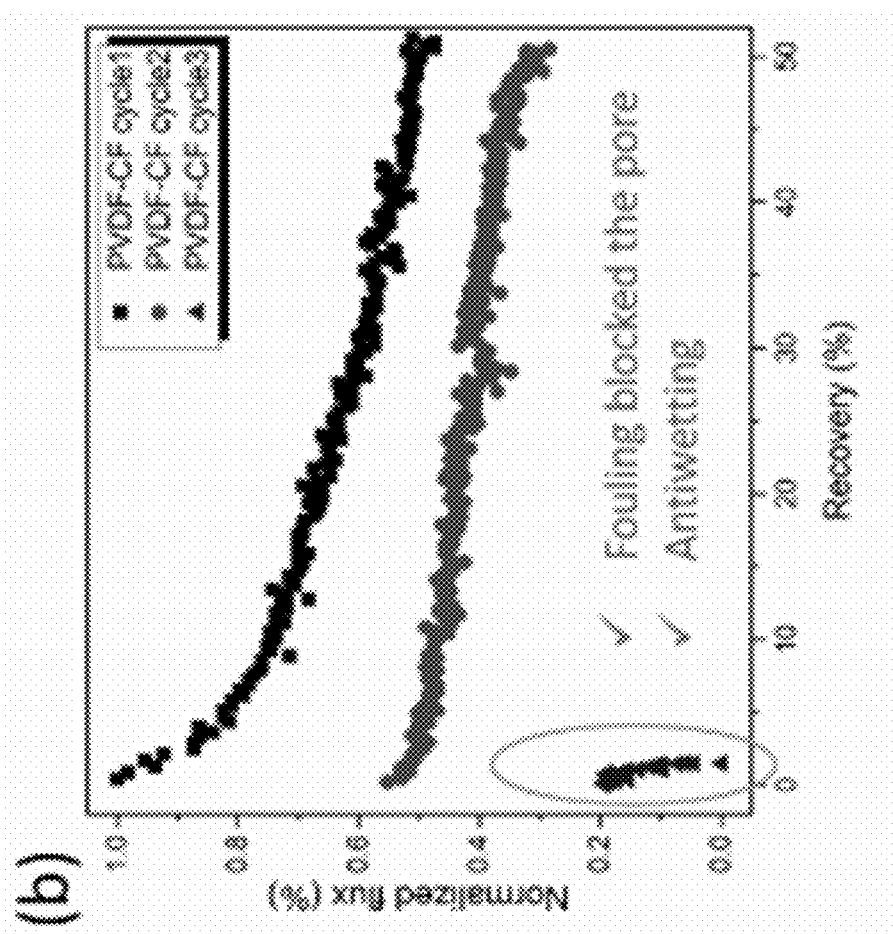
Figure 13C:
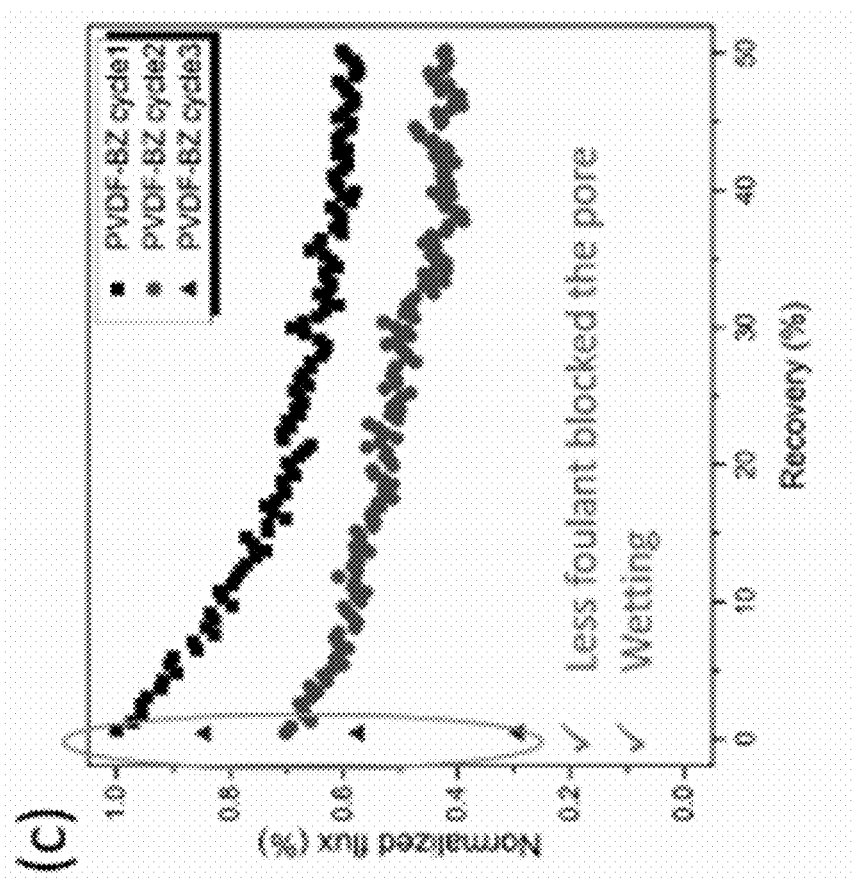
Figure 14A:
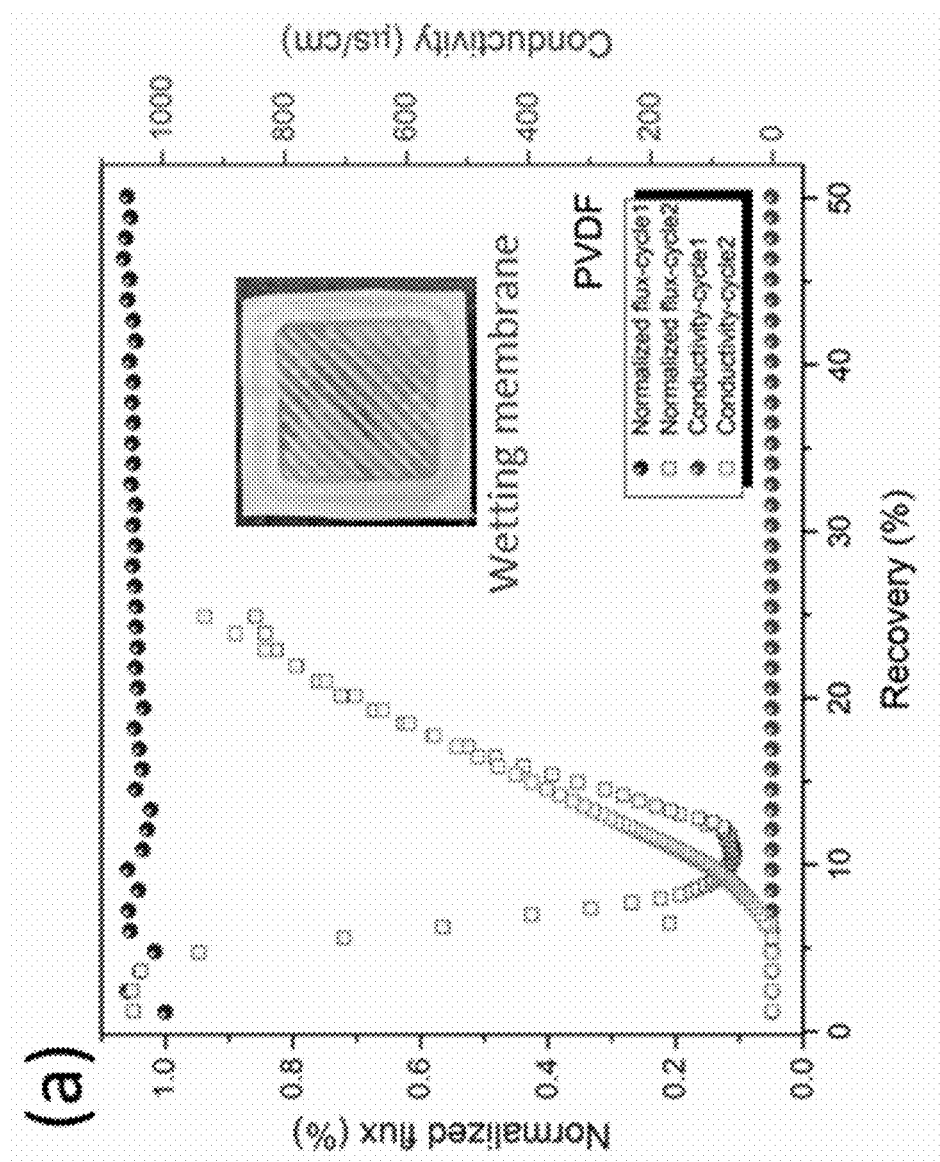
FIGS. 14A, 14B, and 14C graphically illustrate the long-term cycle test for the inorganic scaling solution, gypsum solution for unmodified PVDF (FIG. 14A), omniphobic membrane PVDF-CF (FIG. 14B), and bi-layer membrane, PVDF-BZ (FIG. 14C). Feed and permeate volume were started from 500 ml and 1000 ml, respectively. Each cycle was terminated by 50% water recovery.
Figure 14B:
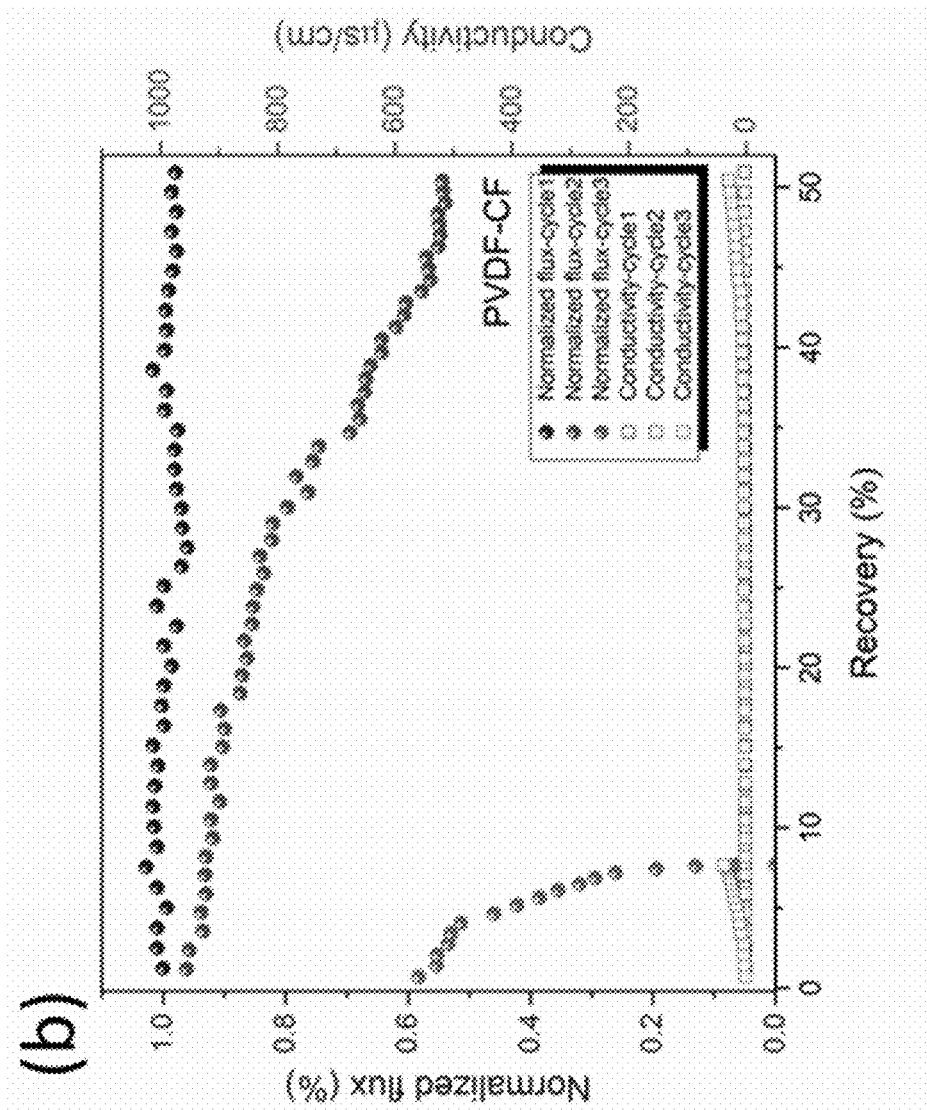

FIG. 13 shows the membrane treating the model produced water containing organic components. The composition of the model produced water is shown below in Table 2. No result was obtained for unmodified PVDF membrane because the surfactant induced membrane wetting as shown in FIG. 14B. The PVDF-BZ bi-layered membrane (FIG. 14C) demonstrated a better fouling resistance than the omniphobic membrane PVDF-CF (FIG. 13B) after two cleaning cycles. After the third cleaning cycles, all membranes failed.

TABLE 2

Organic components in synthetic produced water

| Parameter | Unit (mg/L) | Model compounds | Amount |
|---|---|---|---|
| Total Organic compounds | 400 | composition of fracturing fluid | |
| | | aromatic hydrocarbons | |
| | | Benzene | 4.0 mg |
| | | xylene | 4.0 mg |
| | | toluene | 4.0 mg |
| | | aromatic acids | |
| | | Benzoic acid | 68.0 mg |
| | | low molecular weight organic acids | |
| | | Acetic acid | 100.0 mg |
| | | saturated hydrocarbon | |
| | | Hexane | 100.0 mg |
| | | surfactant TERGITOL ™ | 100.0 mg |

Figure 14C:
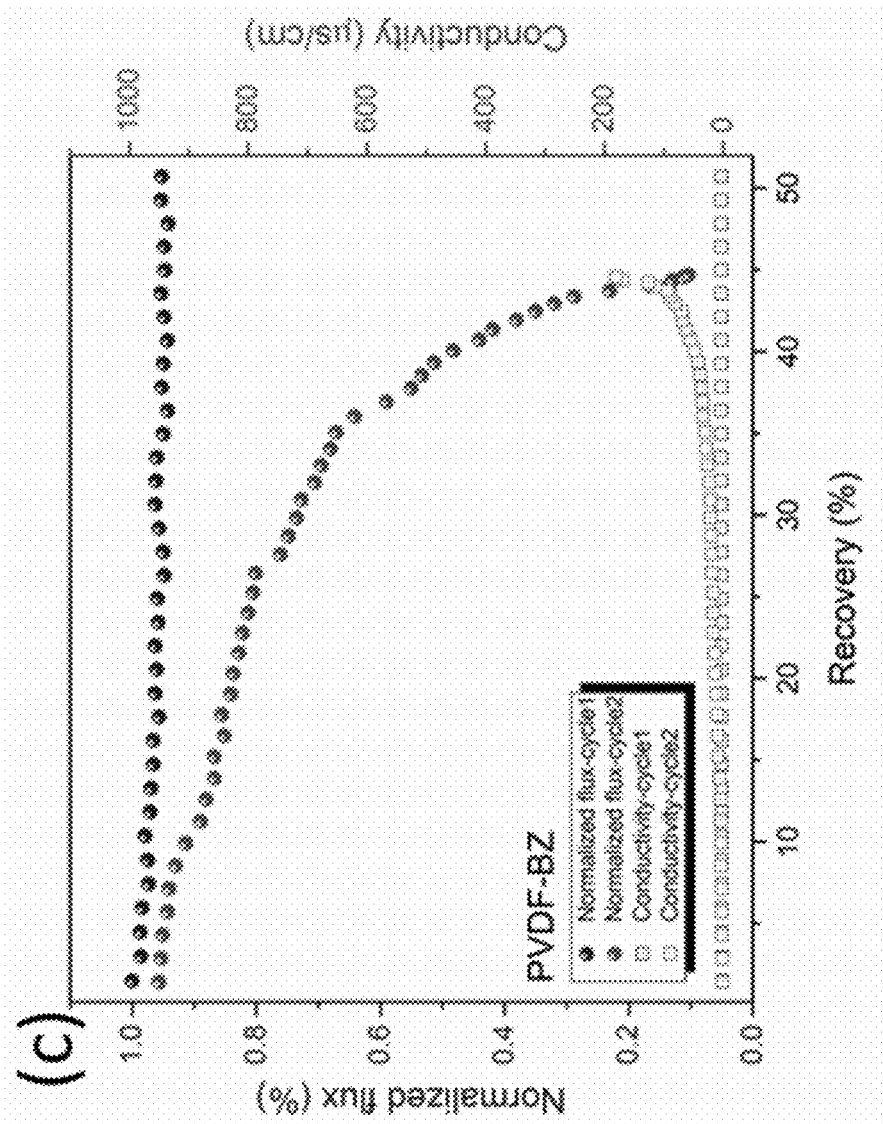

A gypsum solution was used to simulate the inorganic component of produced water, commonly used to determine the membrane anti-scaling ability. FIG. 14 shows the scaling test of the resulting membrane. All membranes demonstrated a good filtration result in cycle 1. However, the normalized flux of PVDF (FIG. 14A) dropped quickly and then increased, along with the conductivity in cycle 2. The scaling was deposited first and reduce the flux, then the scaling inducing the pore wetting. Owing to PVDF-CF superhydrophobic membrane surface (FIG. 14B), membrane scaling and the flux decline was affected after recovery reaching 35% in cycle 2. Its normalized flux was about 55% at the end of cycle 2. Cleaning did not help regenerating the membrane; hence, no flux was found in cycle 3. Similar phenomena were shown on the PVDF-BZ (FIG. 14C), but the severe scaling occurred earlier than PVDF-CF and there is no flux was record after recovery reaching 45% in cycle 2. Even the membrane cleaned with the DI water, the membrane regeneration was unsuccessful.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all the defined steps (except where context excludes that possibility).

Still further, additional aspects of the invention may be found in one or more appendices attached hereto and/or filed herewith, the disclosures of which are incorporated herein by reference as if fully set out at this point.

Thus, the invention is adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A bilayer electrospun membrane, comprising:
    an omniphobic, permeate-facing surface configured to suppress scale formation and low-surface tension compounds from wicking and fouling the membrane; the omniphobic surface comprising nanoparticle fibers decorated or grown thereon through electrochemical interactions; the omniphobic surface further comprising the nanoparticle fibers coated with a fluorine monomer; and
    an oleophobic, feedstock-facing surface configured to prevent foulants from depositing on and adsorbing to the membrane; the oleophobic surface comprising a zwitterionic antifouling co-polymer poly(glycidyl methacrylate-sulfobetaine methacrylate) grafted thereto.

2. The membrane of claim 1 wherein the bilayer electrospun membrane is a bilayer polyvinylidene difluoride, electrospun membrane.

3. The membrane of claim 2 wherein the nanoparticle fibers are negatively charged silica nanoparticle fibers.

4. The membrane of claim 2 wherein the fluorine monomer is 1H,1H,2H,2H-perfluorodecyltriethoxysilane.

5. The membrane of claim 2 wherein the omniphobic surface further comprises a positively charged monomer.

6. The membrane of claim 5 wherein the positively charged monomer is cetyltrimethylammonium bromide.

7. The membrane of claim 1 wherein the zwitterionic co-polymer is grafted to the oleophobic surface through epoxy ring-opening reactions.

8. A process comprising the step of fracking wastewater vi membrane distillation using the bilayer electrospun membrane of claim 1.

9. An electrospun zwitterionic membrane, the membrane comprising:
    an omniphobic surface comprising (a) a positively charged cetyltrimethylammonium bromide monomer, (b) negatively charged silica nanoparticle fibers decorated or grown on the cetyltrimethylammonium bromide monomer, and (c) a fluorine monomer coated on the silica nanoparticle fibers; and
    an oleophobic surface comprising a zwitterionic antifouling co-polymer poly(glycidyl methacrylate-sulfobetaine methacrylate) grafted thereto through epoxy ring-opening reactions.

10. The electrospun zwitterionic membrane of claim 9 wherein the fluorine monomer is 1H,1H,2H,2H-perfluorodecyltriethoxysilane.

11. A process comprising the step of treating fracking wastewater via membrane distillation using the electrospun zwitterionic membrane of claim 9.

12. A bilayer membrane distillation membrane for separation of hydraulic fracturing-produced water via membrane distillation, the membrane comprising:
    polyvinylidene difluoride-cetyltrimethylammonium bromide fibers configured to face a permeate stream, the polyvinylidene difluoride-cetyltrimethylammonium bromide fibers modified to form an omniphobic surface of the membrane, the omniphobic surface comprising salinized silica nanoparticles; and
    alkali-treated polyvinylidene difluoride nanofibers configured to face a feed stream, the polyvinylidene difluoride nanofibers modified to form a hydrophilic surface of the membrane, the hydrophilic surface comprising a zwitterionic poly(glycidyl methacrylate-sulfobetaine methacrylate) polymer grafted to the alkali-treated polyvinylidene difluoride nanofibers.

13. A process comprising the step of treating fracking wastewater via membrane distillation using the bilayer membrane distillation membrane of claim 12.

14. A process for preparing a polyvinylidene difluoride (PVDF) membrane, the process comprising the steps of:
   (a) electrospinning a PVDF polymer solution to form a PVDF fiber membrane;
   (b) fabricating an omniphobic surface of the PVDF fiber membrane, comprising the steps of:
      contacting the PVDF fiber membrane with a positively charged cetyltrimethylammonium bromide (CTAB) monomer to generate positively charged PVDF-CTAB fibers;
      growing negative charged silica nanoparticles on the positively charged PVDF-CTAB fibers through electrostatic absorption interaction;
      coating a fluorine monomer on the silica nanoparticles to fabricate the omniphobic surface of the PVDF fiber membrane; and
   (c) fabricating an oleophobic surface of the PVDF fiber membrane, comprising the steps of:
      contacting the PVDF fiber membrane with an alkaline solution to generate hydroxy groups;
      grafting a zwitterionic co-polymer poly(glycidyl methacrylate-sulfobetaine methacrylate) on the hydroxy groups through epoxy ring-opening reactions to fabricate the oleophobic surface of the PVDF fiber membrane.

15. The process of claim 14 wherein the alkaline solution is sodium hydroxide (NaOH).

* * * * *